US012609852B2

(12) United States Patent (10) Patent No.: US 12,609,852 B2
Yamamoto et al. (45) Date of Patent: Apr. 21, 2026

(54) TERMINAL AND COMMUNICATION METHOD USING SEMI-STATIC PHYSICAL UPLINK CONTROL CHANNEL (PUCCH) RESOURCE CONFIGURATION

(71) Applicant: Panasonic Intellectual Property Corporation of America, Torrance, CA (US)

(72) Inventors: Tetsuya Yamamoto, Kanagawa (JP); Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 243 days.

(21) Appl. No.: 17/795,793

(22) PCT Filed: Feb. 3, 2021

(86) PCT No.: PCT/JP2021/003866
§ 371 (c)(1),
(2) Date: Jul. 27, 2022

(87) PCT Pub. No.: WO2021/161861
PCT Pub. Date: Aug. 19, 2021

(65) Prior Publication Data
US 2023/0053388 A1 Feb. 23, 2023

(30) Foreign Application Priority Data
Feb. 10, 2020 (JP) ................................. 2020-020721

(51) Int. Cl.
*H04L 27/26* (2006.01)
*H04W 72/21* (2023.01)
*H04W 74/04* (2009.01)

(52) U.S. Cl.
CPC ............. *H04L 27/26* (2013.01); *H04W 72/21* (2023.01); *H04W 74/04* (2013.01)

(58) Field of Classification Search
CPC ........ H04L 27/26; H04W 74/04; H04W 72/21
See application file for complete search history.

(56) References Cited

U.S. PATENT DOCUMENTS

2020/0045722 A1* 2/2020 Bae ........................ H04W 72/21
2020/0205150 A1* 6/2020 Cheng ................... H04W 72/21
(Continued)

FOREIGN PATENT DOCUMENTS

WO WO 2021176418 A1 9/2021

OTHER PUBLICATIONS

CATT, "PUSCH enhancements for URLLC," R1-1912170, Agenda Item: 7.2.6.3, 3GPP TSG RAN WG1 Meeting #99, Reno, USA, Nov. 18-22, 2019. (9 pages).
(Continued)

*Primary Examiner* — Jackie Zuniga Abad
(74) *Attorney, Agent, or Firm* — Seed Intellectual Property Law Group LLP

(57) ABSTRACT
This terminal is provided with a control circuit for setting a plurality of transmission opportunities with respect to a unit time interval corresponding to a scheduling unit, and a transmit circuit for performing repetitive transmission of uplink control information in the plurality of transmission opportunities.

18 Claims, 20 Drawing Sheets

(56) References Cited

U.S. PATENT DOCUMENTS

| 2020/0275431 | A1* | 8/2020 | Bae | H04W 72/04 |
| 2022/0095337 | A1* | 3/2022 | Wang | H04L 5/0053 |
| 2022/0116968 | A1* | 4/2022 | Choi | H04W 72/1268 |
| 2022/0353698 | A1* | 11/2022 | Jang | H04L 5/0053 |
| 2022/0368460 | A1* | 11/2022 | Takahashi | H04L 1/1812 |
| 2024/0015723 | A1* | 1/2024 | Yang | H04L 5/001 |

OTHER PUBLICATIONS

ETRI, "UCI enhancements," R1-1912642, Agenda Item: 7.2.6.2, 3GPP TSG RAN WG1 #99, Reno, USA, Nov. 18-22, 2019. (4 pages).

Extended European Search Report, dated Jul. 7, 2023, for European Patent Application No. 21753645.7-1213. (11 pages).

3GPP, "3rd Generation Partnership Project; Technical Specification Group Radio Access Network; NR; Base Station (BS) radio transmission and reception (Release 15)," 3GPP TS 38.104 V15.8.0, Dec. 2019. (227 pages).

3GPP, "3rd Generation Partnership Project; Technical Specification Group Radio Access Network; NR; Multiplexing and channel coding (Release 15)," 3GPP TS 38.212 V15.8.0, Dec. 2019. (101 pages).

3GPP, "3rd Generation Partnership Project; Technical Specification Group Radio Access Network; NR; Physical layer procedures for control (Release 15)," 3GPP TS 38.213 V15.8.0, Dec. 2019. (109 pages).

3GPP, "3rd Generation Partnership Project; Technical Specification Group Radio Access Network; NR; Physical layer procedures for data (Release 15)," 3GPP TS 38.214 V15.8.0, Dec. 2019. (106 pages).

3GPP, "3rd Generation Partnership Project; Technical Specification Group Services and System Aspects; Release 15 Description; Summary of Rel-15 Work Items (Release 15)," 3GPP TR 21.915 V15.0.0, Sep. 2019. (118 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; NR and NG-RAN Overall Description; Stage 2 (Release 15)," 3GPP TS 38.300 V15.8.0, Dec. 2019. (99 pages).

3GPP, "3rd Generation Partnership Project; Technical Specification Group Radio Access Network; NR; Physical layer procedures for data (Release 16)," 3GPP TS 38.214 V16.0.0, Dec. 2019. (147 pages).

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical channels and modulation (Release 15)," 3GPP TS 38.211 V15.8.0, Dec. 2019. (97 pages).

China Telecom, "New SID on NR coverage enhancement," RP-193240, Agenda Item: 9.1.1, 3GPP TSG RAN Meeting #86, Sitges, Spain, Dec. 9-12, 2019. (4 pages).

International Search Report, mailed May 11, 2021, for International Patent Application No. PCT/JP2021/003866. (3 pages) (with English translation).

Sharp, "Remaining issues of UCI enhancements for eURLLC," R1-1912769, Agenda Item: 7.2.6.2, 3GPP TSG RAN WG1 #99, Reno, USA, Nov. 18-22, 2019. (2 pages).

LG Electronics, "UCI enhancements for NR URLLC," R1-1912397, Agenda item: 7.2.6.2, 3GPP TSG RAN WG1 #99, Reno, USA, Nov. 18-22, 2019. (6 pages).

* cited by examiner

|  | PUCCH format 0 | PUCCH format 1 | PUCCH format 2 | PUCCH format 3 | PUCCH format 4 |
|---|---|---|---|---|---|
| Use case | Short PUCCH HARQ/SR 1-2 bits | Long PUCCH HARQ/SR 1-2 bits | Short PUCCH Any UCI >2 bits | Long PUCCH Any UCI >2 bits | Long PUCCH Any UCI >2 bits |
| Duration | 1-2 symbols | 4-14 symbols | 1-2 symbols | 4-14 symbols | 4-14 symbols |
| Starting symbol | Anywhere unless the PUCCH cross slot boundary | | | | |
| RB size | 1 RB | 1 RB | 1-16 RBs | 1-16 RBs | 1 RB |
| CDM capacity | 6 (1 bit) 3 (2 bits) | 36 (14 symbols with frequency hopping) 84 (14 symbols without frequency hopping) | 1 | 1 | 2 or 4 |
| Multiplexing | Cyclic shift | Cyclic shift + TD-OCC | - | - | FD-OCC |
| Coding scheme | - | - | RM (up to 11 bits) Polar (>11 bits) | | |
| Waveform | Singe-carrier | Singe-carrier | CP-OFDM | Singe-carrier | Singe-carrier |

| Nominal PUCCH length | Number of multiplexable terminals by OCC | |
| --- | --- | --- |
| | No intra-repetition hopping | Intra-repetition hopping |
| 4 | 2 | 1 |
| 5 | 2 | 1 |
| 6 | 3 | 1 |
| 7 | 3 | 1 |
| 8 | 4 | 2 |
| 9 | 4 | 2 |
| 10 | 5 | 2 |
| 11 | 5 | 2 |
| 12 | 6 | 3 |
| 13 | 6 | 3 |
| 14 | 7 | 3 |

FIG. 13

TERMINAL AND COMMUNICATION METHOD USING SEMI-STATIC PHYSICAL UPLINK CONTROL CHANNEL (PUCCH) RESOURCE CONFIGURATION

TECHNICAL FIELD

The present disclosure relates to a terminal and a communication method.

BACKGROUND ART

In recent years, a dramatic development of Internet of Things (IoT) has been expected with the expansion and diversification of radio services as a background. The usage of mobile communication is expanding to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. Given such a background, the 5th generation mobile communication systems (5G), which have been undergoing research and development and standardization, can flexibly provide radio communication in response to a wide variety of needs by enhanced mobile broadband (eMBB), massive machine type communication (mMTC), and ultra reliable and low latency communication (URLLC).

The 3rd Generation Partnership Project (3GPP) as an international standardizing body has been specifying New Radio (NR) as one of 5G radio interfaces.

CITATION LIST

Non-Patent Literature

NPL 1
3GPP TS38.104 V15.8.0, "NR Base Station (BS) radio transmission and reception (Release 15)," 2019-12.
NPL 2
RP-193240, "New SID on NR coverage enhancement," China Telecom, December 2019.
NPL 3
3GPP TS 38.211 V15.8.0, "NR; Physical channels and modulation (Release 15)," 2019-12.
NPL 4
3GPP TS 38.212 V15.8.0, "NR; Multiplexing and channel coding (Release 15)," 2019-12.
NPL 5
3GPP TS 38.213 V15.8.0, "NR; Physical layer procedure for control (Release 15)," 2019-12.
NPL 6
3GPP TS 38.214 V15.8.0, "NR; Physical layer procedures for data (Release 15)," 2019-12.
NPL 7
3GPP TR 21.915 V15.0.0, "Summary of Rel. 15 Work Items (Release 15)," 2019-09.
NPL 8
3GPP TS 38.300 V15.8.0, "NR and NG-RAN overall description, Stage 2 (Release 15)," 2019-12.
NPL 9
3GPP TS 38.214 V16.0.0, "NR; Physical layer procedures for data (Release 16)," 2019-12.

SUMMARY OF INVENTION

However, there is scope for further study on a repeated transmission (repetition) of control information in uplink (hereinafter may be conveniently referred to as "uplink control information").

One non-limiting and exemplary embodiment facilitates providing a terminal and a communication method each capable of improving the transmission efficiency in a repeated transmission of uplink control information.

A terminal according to an exemplary embodiment of the present disclosure includes: control circuitry, which, in operation, configures a plurality of first transmission occasions for a unit time duration corresponding to a scheduling unit; and transmission circuitry, which, in operation, performs a repeated transmission of uplink control information in the plurality of first transmission occasions.

It should be noted that general or specific embodiments may be implemented as a system, a method, an integrated circuit, a computer program, a storage medium, or any selective combination thereof.

According to an exemplary embodiment of the present disclosure, it is possible to improve the transmission efficiency in a repeated transmission of uplink control information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates an exemplary Physical Uplink Control Channel (PUCCH) format;

FIG. 8 illustrates another exemplary PUSCH repetition;

FIG. 13 illustrates an exemplary Orthogonal Cover Code (OCC) number;

DESCRIPTION OF EMBODIMENTS

Figure 2:
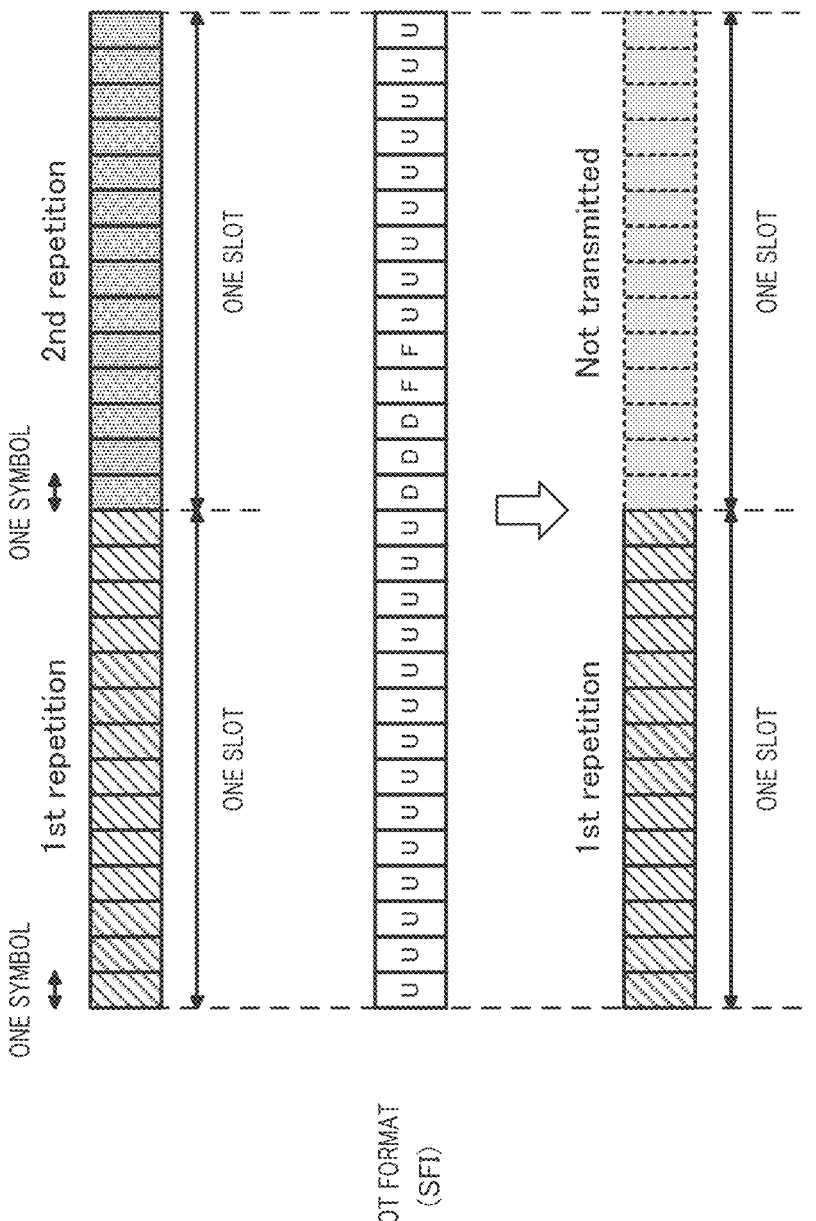
FIG. 2 illustrates an exemplary PUCCH repetition.

Hereinafter, embodiments of the present disclosure will be described in detail with reference to the accompanying drawings.

In NR, for example, in addition to a frequency band of 6 GHz or less, mainly within 700 MHz to 3.5 GHz band (e.g., may be referred to as Frequency Range 1 (FR1)), which has been used for cellular communication, a millimeter-wave band such as 28 GHz or 39 GHz band capable of ensuring a wide band (e.g., may be referred to as FR2) can be utilized (e.g., see NPL 1). Further, for example, in FR1, a high frequency band is possibly used compared with the frequency band used in Long Term Evolution (LTE) or 3rd Generation mobile communication systems (3G) such as 3.5 GHz band. The higher the frequency band is, the greater a radio wave propagation loss is, and thus, the received quality of radio waves is likely to be deteriorated. Hence, in NR, for example, a method has been studied for ensuring almost the same communication area (or coverage) as to the Radio Access Technology (RAT) such LTE or 3G, in other words, ensuring the appropriate communication when the frequency band higher than that in LTE or 3G is used (e.g., see NPL 2).

For example, in downlink of NR, a terminal (e.g., may be referred to as User Equipment (UE)) receives downlink data (e.g., Physical Downlink Shared Channel (PDSCH)) according to resource allocation by a base station (e.g., may be referred to as gNB) (e.g., see NPLs 3 to 6). Information on the resource allocation may be indicated from the base station to the terminal by, for example, a layer-1 control signal (e.g., Downlink Control Information (DCI)) in a downlink control channel (e.g., Physical Downlink Control Channel (PDCCH)).

Further, the terminal feedbacks, to the base station, a response signal (e.g., Acknowledgement/Negative Acknowledgement (ACK/NACK) or Hybrid Automatic Repeat Request (HARQ)-ACK) indicating success or failure of decoding for PDSCH by using, for example, an uplink control channel (e.g., Physical Uplink Control Channel (PUCCH)) (e.g., see NPL 5).

Further, the terminal may use, for example, PUCCH to transmit, in addition to ACK/NACK, downlink channel state information (e.g., Channel State Information (CSI)) and uplink radio resource allocation request (e.g., Scheduling Request (SR)) to the base station. ACK/NACK, CSI, and SR may be also referred to as uplink control information (e.g., Uplink Control Information (UCI)).

In NR Rel. 15 and NR Rel. 16, for example, PUCCH may be repeatedly transmitted (or may be referred to as a PUCCH repetition) by using a plurality of slots (i.e., a plurality of unit time durations corresponding to scheduling unit) (e.g., see NPL 5). The repeated transmission of PUCCH can improve, for example, the communication quality of PUCCH.

For example, information on whether the terminal performs the repeated transmission of PUCCH and the number of repetitions (e.g., number of slots) in the repeated transmission may be semi-statically indicated (i.e., configured or instructed) from the base station to the terminal by an UE-specific higher-layer signaling (e.g., may be referred to as radio resource control (RRC) signal, higher layer signaling, or higher layer parameter).

Further, for example, with respect to identification of a PUCCH resource for transmitting ACK/NACK to PDSCH assigned by DCI, the following method may be adopted (see, e.g., NPL 5). In one example, the base station semi-statically indicates a union of PUCCH resources (e.g., referred to as PUCCH resource set or resource list) by an UE-specific higher-layer signaling (e.g., RRC signal). The base station then indicates the terminal of (e.g., indicate) the PUCCH resource to be allocated among a plurality of PUCCH resources included in the PUCCH resource set by DCI (i.e., dynamic signaling).

Here, the PUCCH resource may be configured with, for example, parameters such as a PUCCH format, a time resource (e.g., symbol position or number of symbols), a frequency resource (e.g., physical resource block (PRB) number, number of PRBs, and/or whether to apply frequency hopping), and a code resource (e.g., cyclic shift sequence number or orthogonal code number).

Further, with respect to identification of a PUCCH resource for transmitting SR or CSI, for example, the base station may semi-statically indicate (or configure) the PUCCH resource by an UE-specific higher-layer signaling (e.g., RRC signal).

In NR Rel. 15 and NR Rel. 16, for example, when a terminal transmits a certain UCI (e.g., which may include a plurality of UCIs), the number of PUCCHs that can be transmitted within one slot (i.e., unit duration of one scheduling) is one.

Meanwhile, in the case of application of the PUCCH repetition, for example, the same PUCCH resource allocation may be applied over a plurality of slots. With respect to a frequency resource, slot-based frequency hopping may be applied.

In NR Rel. 15 and NR Rel. 16, for example, five PUCCH formats (e.g., PUCCH formats 0 to 4) are defined (see, e.g., NPL 7 or 8). FIG. 1 illustrates examples of PUCCH formats 0 to 4.

For example, PUCCH format 0 may be composed of one or two symbols and transmit a UCI of up to two bits (e.g., one-bit UCI or two-bit UCI, the same applies hereinafter). For example, PUCCH format 1 may be composed of four to 14 symbols and transmit a UCI of up to two bits. For example, PUCCH format 2 may be composed of one or two symbols and transmit a UCI of the number of bits greater than two. For example, PUCCH format 3 may be composed of four to 14 symbols and transmit a UCI of the number of bits greater than two. For example, PUCCH format 4 may be composed of four to 14 symbols and transmit a UCI of the number of bits greater than two.

Note that, in PUCCH format 4, an orthogonal code (e.g., Orthogonal Cover Code (OCC)) may be used to multiplex a plurality of terminals to the same time or frequency resource (e.g., resource block (RB).

In NR Rel. 15 and NR Rel. 16, for example, a terminal max identify a type of slot or a type of symbol in the slot (e.g., may be referred to as slot format) by using information received from the base station (e.g., Slot Format Indicator (SFI)). The type of symbol may be any of, for example, a downlink symbol (sometimes referred to as "D"), an uplink symbol (sometimes referred to as "U"), and a Flexible symbol (sometimes referred to as "F"). SFI may be indicated by, for example, an RRC signal or a group common downlink control signal (Group common PDCCH).

Here, in the PUCCH resource specified by the above-mentioned method (i.e., uplink resources), part of a time resource (for example, symbols) may conflict (in other words, overlap or collide) with information on uplink and downlink (hereinafter may be also referred to as "uplink/downlink pattern") indicated by SFI. For example, some symbols in the time resource of PUCCH may be configured as a downlink symbol or a flexible symbol in SFI. In this case, the terminal does not transmit PUCCH in the slot. In other words, the terminal drops the transmission of PUCCH in a slot having a conflict between the PUCCH resource and the uplink/downlink pattern. Incidentally, the symbol configured as the Flexible symbol in SH may be regarded as a conflict of the uplink/downlink pattern as well as the downlink symbol as described above, or may be regarded as the uplink symbol.

FIG. 2 illustrates examples of the number of symbols used for PUCCH transmission in a duration of each PUCCH repetition (hereinafter referred to as "PUCCH transmission symbol number") L=14 and the number of PUCCH repetitions K (hereinafter may be also referred to as repetition number K)=2. In FIG. 2, for example, in the second slot, some of the symbols assigned to the PUCCH transmission (e.g., first to third symbols) are configured as downlink symbol(s) (D). Accordingly, the terminal does not transmit (i.e., drops) PUCCH in the second slot including these symbols.

In NR, for example, an uplink/downlink pattern (e.g., patterns of "D," "U," and "F") in Time Division Duplex (TDD) can be semi-statically or dynamically controlled. For example, the uplink/downlink pattern can be controlled according to uplink and downlink traffic conditions. By way of example, when a ratio of the downlink traffic is greater than that of uplink, it is assumed that a proportion of downlink symbols in the uplink/downlink pattern is set to be higher than that of uplink symbols.

Further, it is assumed that a terminal that applies a Coverage Enhancement (CE) to PUCCH repeatedly transmits PUCCH over a plurality of slots, for example. In one example, when the same PUCCH resource allocation is applied over the plurality of slots as mentioned above in the repeated transmission of PUCCH and a conflict with the uplink/downlink pattern (e.g., "D" or "F") occurs in at least part of PUCCH resources (e.g., time resources), the terminal does not transmit PUCCH in the slot. Hence, in the repeated transmission of PUCCH, the higher occurrence frequency of conflict with the uplink/downlink pattern is, the higher possibility that PUCCH is not transmitted is, and thus, a transmission quality of PUCCH is likely to be deteriorated, which results in that an expected coverage enhancement effect may not be obtained.

Besides, for example, when the uplink/downlink pattern is configured based on the setting of the terminal to which the coverage enhancement is applied, it is assumed that a proportion of the uplink symbols is set to be higher than that of the downlink symbols over the plurality of slots in which PUCCH is transmitted. Hence, flexibility for the configuration of the uplink/downlink pattern decreases, and the frequency-utilization efficiency in downlink is thus possibly reduced.

In one non-limiting exemplary embodiment of the present disclosure, for example, a method will be described for suppressing a reduction in the frequency-utilization efficiency in downlink and thus improving the transmission quality in the repeated transmission of PUCCH.

[Overview of Communication System]

A communication system according to each embodiment of the present disclosure includes base station 100 and terminal 200.

Figure 3:
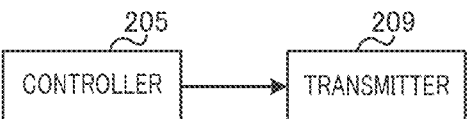
FIG. 3 is a block diagram illustrating a configuration example of a part of a terminal.

FIG. 3 is a block diagram illustrating a configuration example of a part of terminal 200 according to an exemplary embodiment of the present disclosure. In terminal 200 illustrated in FIG. 3, controller 205 (e.g., corresponding to control circuitry), configures a plurality of first transmission durations (e.g., PUCCH repetitions) with respect to a unit time duration (e.g., slot) corresponding to a scheduling unit. Transmitter 209 (e.g., corresponding to transmitting circuitry), performs a repeated transmission of the uplink control information (e.g., UCI) in the plurality of first transmission durations. Incidentally, the term "transmission duration" may be replaced with a term "transmission occasion or transmission opportunity."

[Configuration of Base Station]

Figure 4:
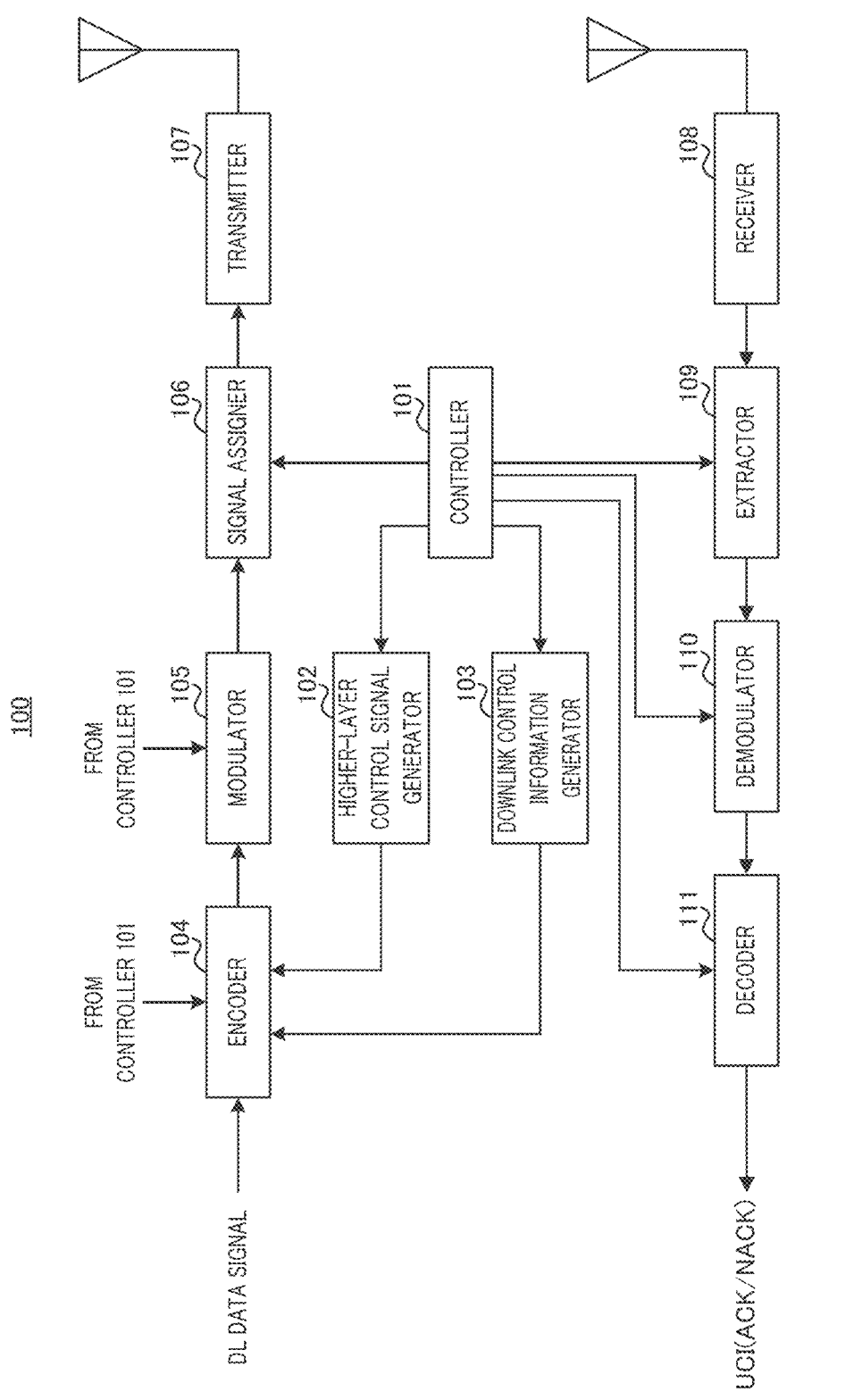
FIG. 4 is a block diagram illustrating a configuration example of a base station.

FIG. 4 is a block diagram illustrating a configuration example of base station 100 according to Embodiment 1. In FIG. 4, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101, for example, determines information on a slot format for terminal 200 (e.g., SFI) and outputs the determined information to higher-layer control signal generator 102 or downlink control information generator 103.

Controller 101 also determines information on a PUCCH resource for terminal 200, for example, and outputs the determined information to higher-layer control signal generator 102. The information on the PUCCH resource may include, for example, a PUCCH resource set or information on the number of Repetitions (e.g., repetition number K).

Further, controller 101, for example, determines a resource to be actually used by terminal 200 for the repeated transmission of PUCCH based on a PUCCH resource for the terminal to transmit an uplink control signal (e.g., PUCCH) and the information on the slot format (e.g., SFI). Information on the determined resource is output to, for example, extractor 109, demodulator 110, and decoder 111.

In the following, for example, the repeated transmission of PUCCH actually performed by terminal 200 is referred to as "Actual repetition (or Actual PUCCH repetition)." Additionally, a repeated transmission of PUCCH to be configured for terminal 200 with respect to the Actual repetition is referred to as "Nominal repetition (or Nominal PUCCH repetition)."

Controller 101 also determines information on a downlink signal for transmitting a downlink data signal (e.g., PDSCH), a higher-layer control signal (e.g., RRC signal), or downlink control information (e.g., DCI), for example. The information on the downlink signal may include information such as a Modulation and Coding Scheme (MCS) and radio resource allocation. Controller 101, for example, outputs the determined information to encoder 104, modulator 105, and signal assigner 106. In addition, controller 101 outputs information on the downlink signal, such as the data signal or the higher-layer control signal, to downlink control information generator 103.

Higher-layer control signal generator 102, for example, generates a higher-layer control signal bit string based on information input from controller 101 and outputs the higher-layer control signal bit string to encoder 104.

Downlink control information generator 103, for example, generates a downlink control information (e.g., DCI) bit string based on information input from controller and outputs the generated DCI bit string to encoder 104. Note that, the control information may be transmitted to a plurality of terminals.

Encoder 104, for example, encodes downlink data, a bit string input from higher-layer control signal generator 102, or a DCI bit string input from downlink control information generator 103, based on information input from controller 101. Encoder 104 outputs the encoded bit string to modulator 105.

Modulator 105, for example, modulates an encoded bit string input from encoder 104, based on information input from controller 101, and outputs the modulated signal (e.g., symbol string) to signal assigner 106.

Signal assigner 106, for example, maps, to a radio resource, a symbol string (including, for example, downlink data or control signal) input from modulator 105, based on radio resource-indicating information input from controller 101. Signal assigner 106 outputs, to transmitter 107, a downlink signal to which the signal is mapped.

Transmitter 107, for example, performs transmission-waveform generation processing such as orthogonal Frequency Division Multiplexing (OFDM) on a signal input from signal assigner 106. In addition, in the case of, for example, an OFDM transmission in which a cyclic prefix (CP) is added, transmitter 107 performs Inverse Fast Fourier Transform (IFFT) processing on a signal, and adds the CP to the signal resulting from the IFFT. Moreover, transmitter 107 performs RF processing such as D/A conversion or up-conversion on a signal, and transmits the resulting radio signal to terminal 200 via an antenna.

Receiver 108, for example, performs RF processing such as down-conversion or A/D conversion on an uplink signal received from terminal 200 via the antenna. Further, in the case of the OFDM transmission, receiver 108 performs Fast Fourier Transform (FFT) processing on a received signal, and outputs the resulting frequency-domain signal to extractor 109.

Extractor 109, for example, extracts a radio resource part with which an uplink signal (e.g., PUCCH) to be transmitted by terminal 200 is transmitted based on information input from controller 101, and outputs the extracted radio resource part to demodulator 110.

Demodulator 110, for example, demodulates a signal (e.g., PUCCH) input from extractor 109 based on information input from controller 101. Demodulator 110, for example, outputs a demodulation result to decoder 111.

Decoder 111, for example, performs error correction decoding on an uplink signal based on information input from controller 101 and a demodulation result input from demodulator 110 to obtain a reception bit sequence (e.g., UCI such as ACK/NACK) after decoding.

[Configuration of Terminal]

Figure 5:
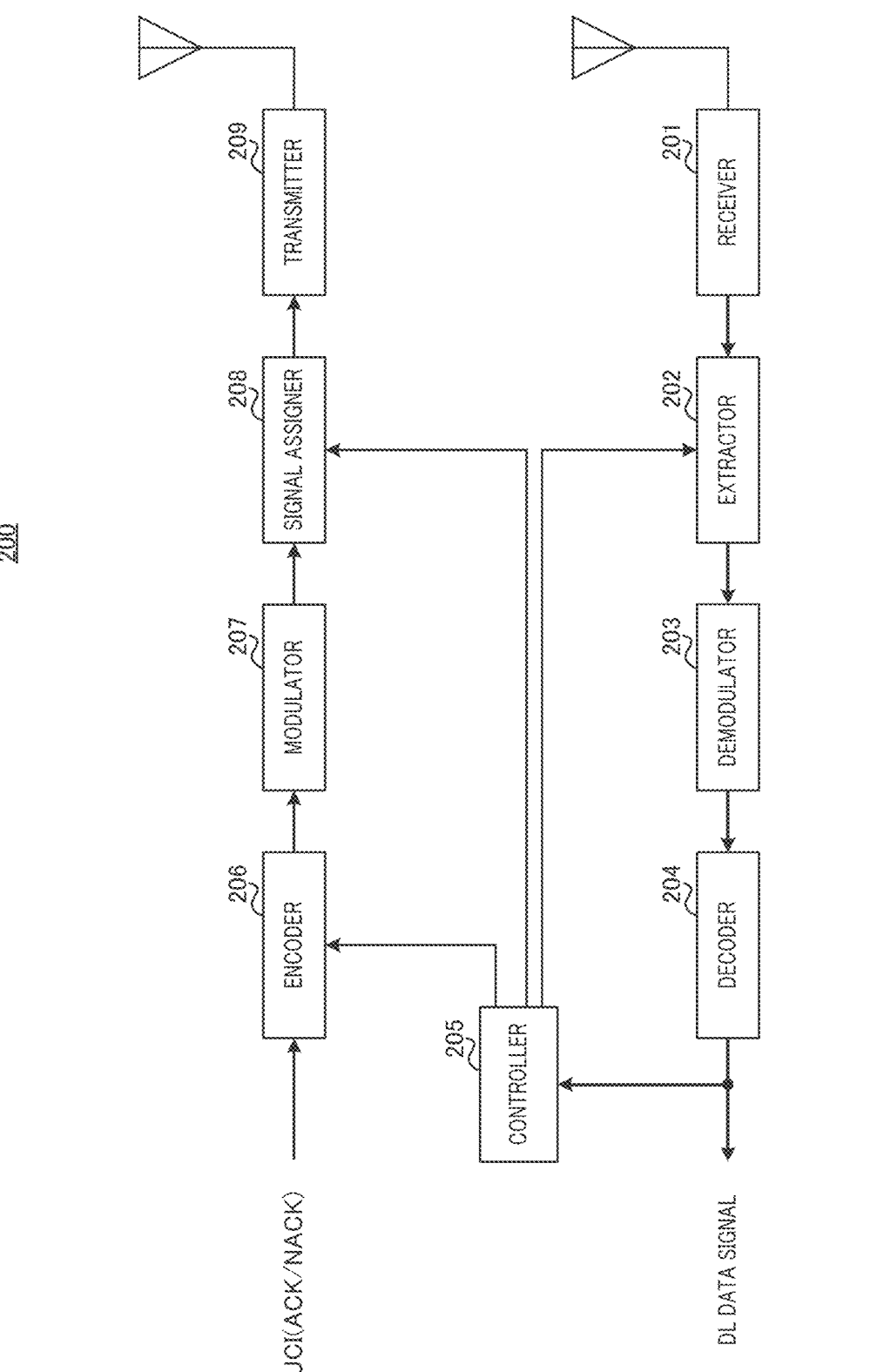
FIG. 5 is a block diagram illustrating a configuration example of the terminal.

FIG. 5 is a block diagram illustrating a configuration example of terminal 200 according to an exemplary embodiment of the present disclosure. For example, in FIG. 5, terminal 200 includes receiver 201, extractor 202, demodulator 203, decoder 204, controller 205, encoder 206, modulator 207, signal assigner 208, and transmitter 209.

Receiver 201, for example, receives a downlink signal (e.g., downlink data signal or downlink control information) from base station 100 via an antenna, performs the RF processing such as the down-conversion or the A/D conversion on the received radio signal to obtain a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts a radio resource part, which may include downlink control information, from a received signal input from receiver 201 based on information on a radio resource in downlink control information input from controller 205, and outputs the radio resource part to demodulator 203. Further, extractor 202 extracts a radio resource part which includes downlink data. based on information on a radio resource for a data signal input from controller 205, and outputs the radio resource part to demodulator 203.

Demodulator 203, for example, demodulates a signal input from extractor 202 and outputs a demodulation result to decoder 204.

Decoder 204, for example, performs error correction decoding on a demodulation result input from demodulator 203 to obtain, for example, downlink reception data, a higher-layer control signal, or downlink control information. Decoder 204 outputs the higher-layer control signal and the downlink control information to controller 205, and outputs the downlink reception data. Further, decoder 204 may generate a response signal (e.g., ACK/NACK) based on a decoding result of the downlink reception data and output the generated response signal to encoder 206.

Controller 205, for example, determines radio resources for a downlink signal (e.g., PDSCH) and an uplink signal (e.g., PUCCH) based on information on a signal (e.g., higher-layer control signal or downlink control information) input from decoder 204.

For example, controller 205 determines (in other words, configures or identifies), based on information on a PUCCH resource, a PUCCH resource to be used for the repeated transmission of PUCCH, which is configured for terminal 200. For example, controller 205 may identify a PUCCH resource to be used for the Nominal repetition based on the information on the PUCCH resource. Controller 205 may also determine, for example, a PUCCH resource to be used for the Actual repetition based on the information on the slot format (e.g., SFI) and the PUCCH resource to be used for the Nominal repetition.

Controller 205, for example, outputs information indicating the determined radio resource for the downlink signal to extractor 202 and outputs information indicating the determined radio resource for the uplink signal to signal assigner 208.

Encoder 206, for example, encodes an uplink signal (e.g., UCI) based on information input from controller 205 and outputs the encoded bit string to modulator 207. The UCI may include, for example, ACK/NACK input from decoder 204. Note that, encoding may not be performed in some PUCCH formats.

Modulator 207, for example, modulates an encoded bit string input from encoder 206 and outputs the modulated signal (symbol string) to signal assigner 208.

Signal assigner 208, for example, maps a signal input from modulator 207 to a radio resource based on information from controller 205, and outputs an uplink signal to which the signal is mapped to transmitter 209.

Transmitter 209, for example, performs the transmission-waveform generation processing such as the OFDM on a signal input from signal assigner 208. In addition, in the case of, for example, the OFDM transmission using the CP, transmitter 209 performs the IFFT processing on a signal, and adds the CP to the signal resulting from the IFFT.

Alternatively, when transmitter 209 generates a single-carrier waveform, for example, a Discrete Fourier Transformer (DFT) may be additionally provided at a rear stage of modulator 207 or a front stage of signal assigner 208 (neither is illustrated). Moreover, transmitter 209, for example, performs the RF processing such as the D/A conversion or the up-conversion on a transmission signal, and transmits the resulting radio signal to base station 100 via the antenna.

[Operation Example of Base Station 100 and Terminal 200]

An operation example of base station 100 and terminal 200 having the above configurations will be described.

Figure 6:
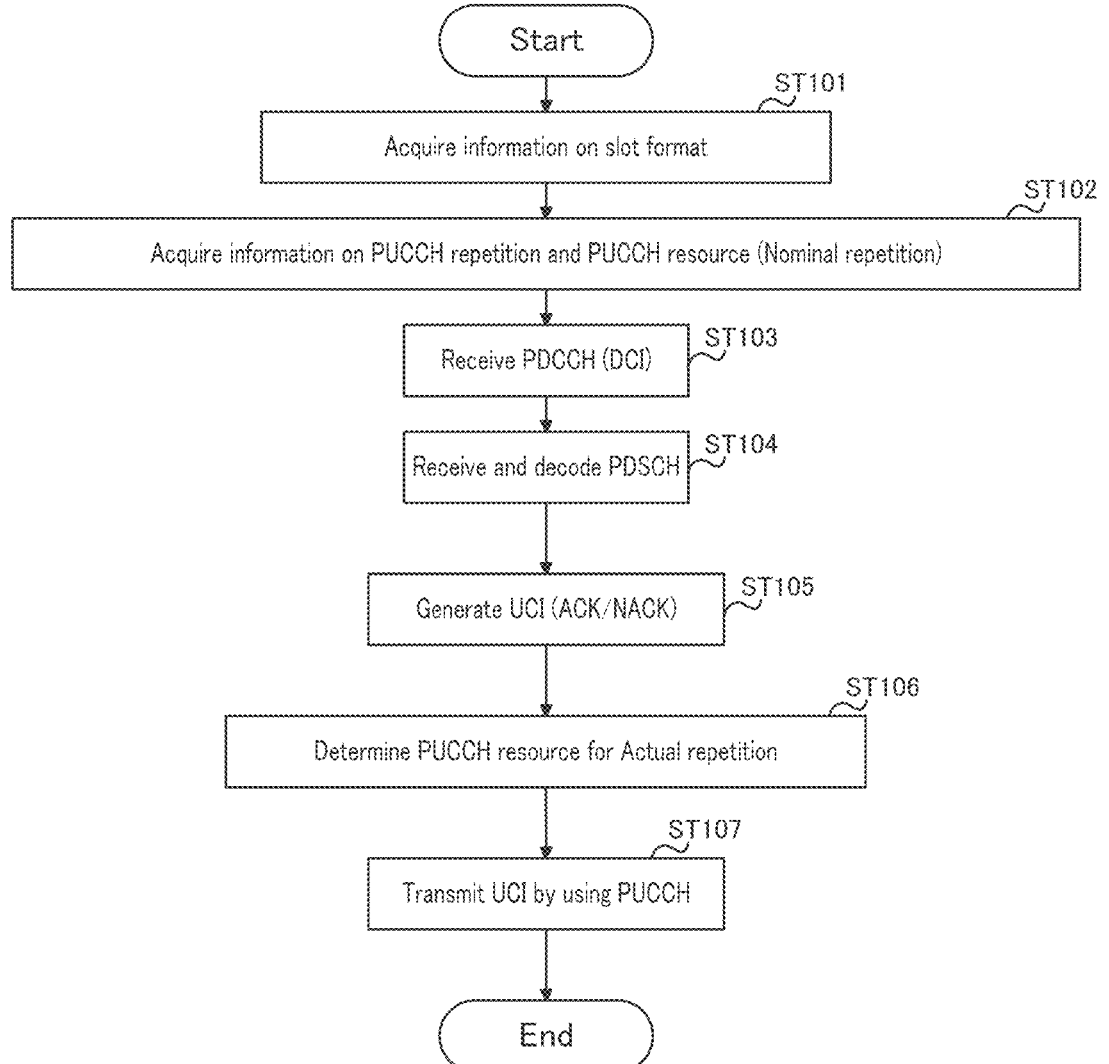
FIG. 6 is a flowchart illustrating an operation example of the terminal.

FIG. 6 is a flowchart illustrating an operation example of terminal 200 according to the present embodiment. FIG. 6 illustrates, by way of example, processing for the repeated transmission of PUCCH including ACK/NACK to PDSCH in terminal 200.

In FIG. 6, terminal 200 acquires, for example, information on the slot format (e.g., SFI) (ST101). For example, SFI may be configured from base station 100 to terminal 200 by signaling of a higher layer (e.g., RRC) or a group common downlink control signal (e.g., Group common PDCCH).

Terminal 200 acquires, for example, information on a PUCCH repetition (e.g., Nominal repetition) and a PUCCH resource (ST102). An exemplary indication method for the information on the PUCCH repetition and the PUCCH resource will be described later. Further, the processing of ST101 and ST102 is not limited to the case to be executed in the order illustrated in FIG. 6 and, for example, may be executed in the reverse order or in parallel.

Terminal 200 receives, for example, PDCCH including DCI (ST103). DCI may include, for example, information on an allocated resource of a downlink data signal (PDSCH) or information on an allocated resource of an uplink signal. Terminal 200, for example, receives a downlink data signal (e.g., PDSCH) and decodes the received PDSCH (ST104). Terminal 200, for example, also generates ACK/NACK to PDSCH based on a decoding result of PDSCH (ST105).

Terminal 200 determines, for example, a PUCCH resource to be used for the Actual repetition (ST106). By way of example, terminal 200 may determine the PUCCH resource to be used for the Actual repetition based on information on the PUCCH resource to be used for the Nominal repetition and the information on the slot format. An exemplary determination method for the PUCCH resource to be used for the Actual repetition will be described later.

Terminal 200, for example, transmits, to base station 100, UCI including ACK/NACK by using the determined PUCCH resource (ST107).

In FIG. 6, although transmission processing for ACK/NACK has been described as an example, terminal 200 may transmit uplink control information (e.g., SR or CSI) that is different from ACK/NACK. Transmission processing for SR or CSI may not include, for example, the reception processing for PDCCH illustrated in FIG. 6 (e.g., processing of ST103) and the reception and decoding processing for PDSCH (e.g., processing of ST104).

[Determination Method for PUCCH Resource]

Next, an exemplary determination method for the PUCCH resource according to the present embodiment will be described.

<PUSCH Resource Allocation>

For example, in NR Rel. 16, a method is defined in which, for transmission of an uplink data channel (e.g., PUSCH), one or more PUSCHs are repeatedly transmitted in one slot (see, e.g., NPL 9). In this method, for example, base station 100 indicates, to terminal 200, allocation of a time resource (e.g., number of symbols) and the number of repetitions for the first (i.e., initial) PUSCH transmission (e.g., first repetition). Additionally, in this method, for example, symbol(s) contiguous to the last PUSCH transmission in the same number of symbols as the last PUSCH transmission may be assigned as the time resource allocation for the second and subsequent PUSCH transmissions (i.e., assignment of PUSCH transmission occasion).

Figure 7:
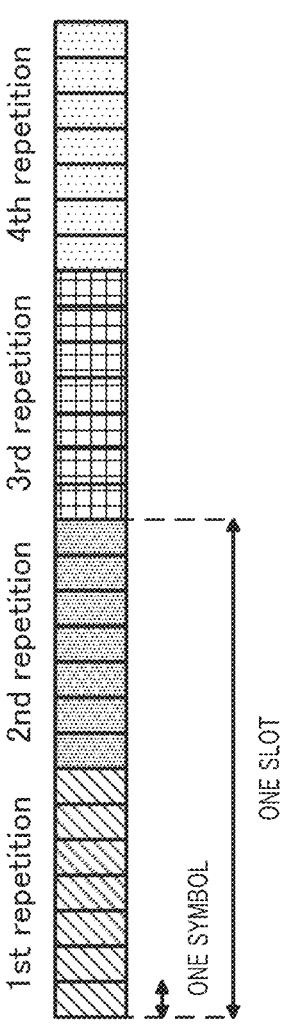
FIG. 7 illustrates an exemplary Physical Uplink Shared Channel (PUSCH) repetition.

FIG. 7 illustrates an exemplary time resource used for a repeated transmission of PUSCH in a case where PUSCH symbol number L=7 and the repetition number K=4 are indicated to terminal 200. In FIG. 7, for example, a PUSCH transmission duration for two PUSCH repetitions is included in one slot.

Further, for example, a transmission duration of one PUSCH assigned by the above-mentioned method (e.g., referred to as Nominal PUSCH repetition) may cross a slot boundary. In this case, terminal 200, for example, may divide (e.g., split) the one PUSCH transmission duration (e.g., Nominal PUSCH repetition duration) into a plurality of PUSCH transmission durations (e.g., Actual PUSCH repetition duration) so as to transmit PUSCH.

Figure 8:
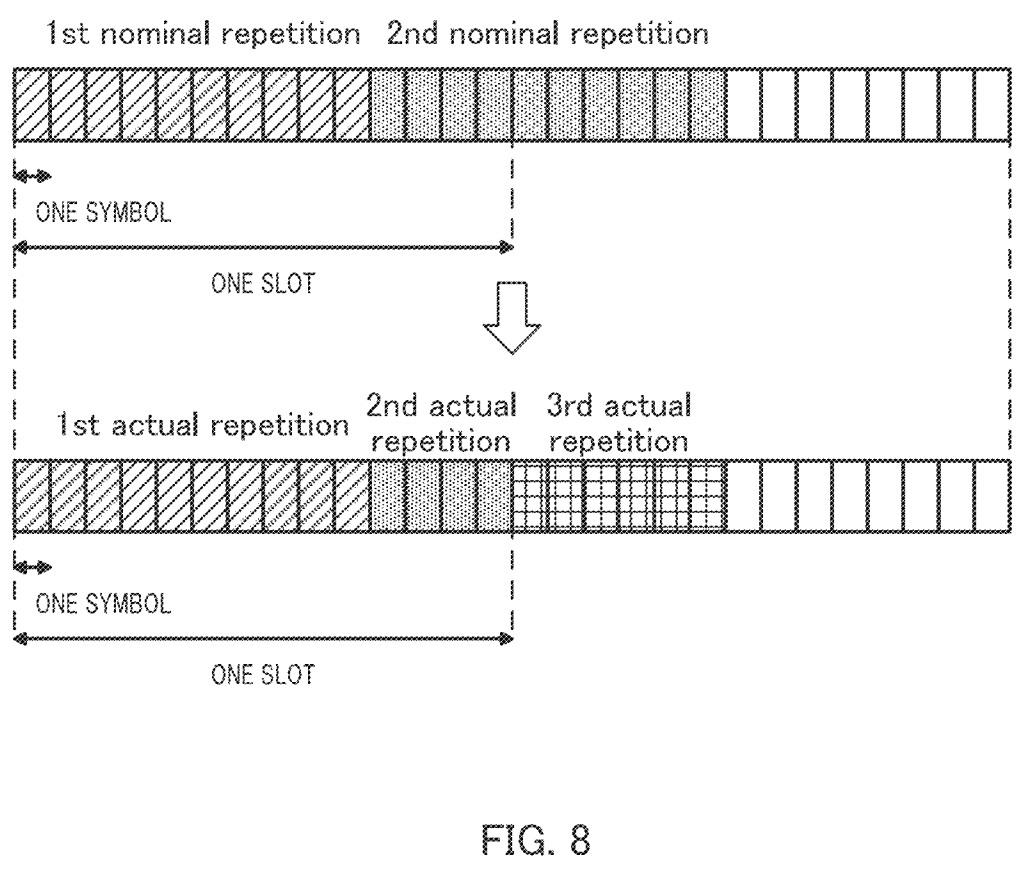

FIG. 8 illustrates an exemplary time resource used for a repeated transmission of PUSCH in a case where PUSCH symbol number L=10 and the repetition number K=2 are indicated to terminal 200.

In FIG. 8, for example, a PUSCH transmission duration for the second Nominal PUSCH repetition crosses a slot boundary. In this case, terminal 200 may divide the PUSCH duration for the second Nominal PUSCH repetition crossing the slot boundary into a plurality of PUSCH durations at the slot boundary. This division enables configuration of PUSCH durations for three Actual PUSCH repetitions.

Meanwhile, for example, in each Nominal PUSCH repetition duration assigned by the above-mentioned method, a conflict with the uplink/downlink pattern may occur. In this situation, terminal 200 may divide the Nominal PUSCFI repetition duration into one or more PUSCH transmission durations (i.e., Actual PUSCH repetition duration) and may thus transmit PUSCH.

Figure 9:
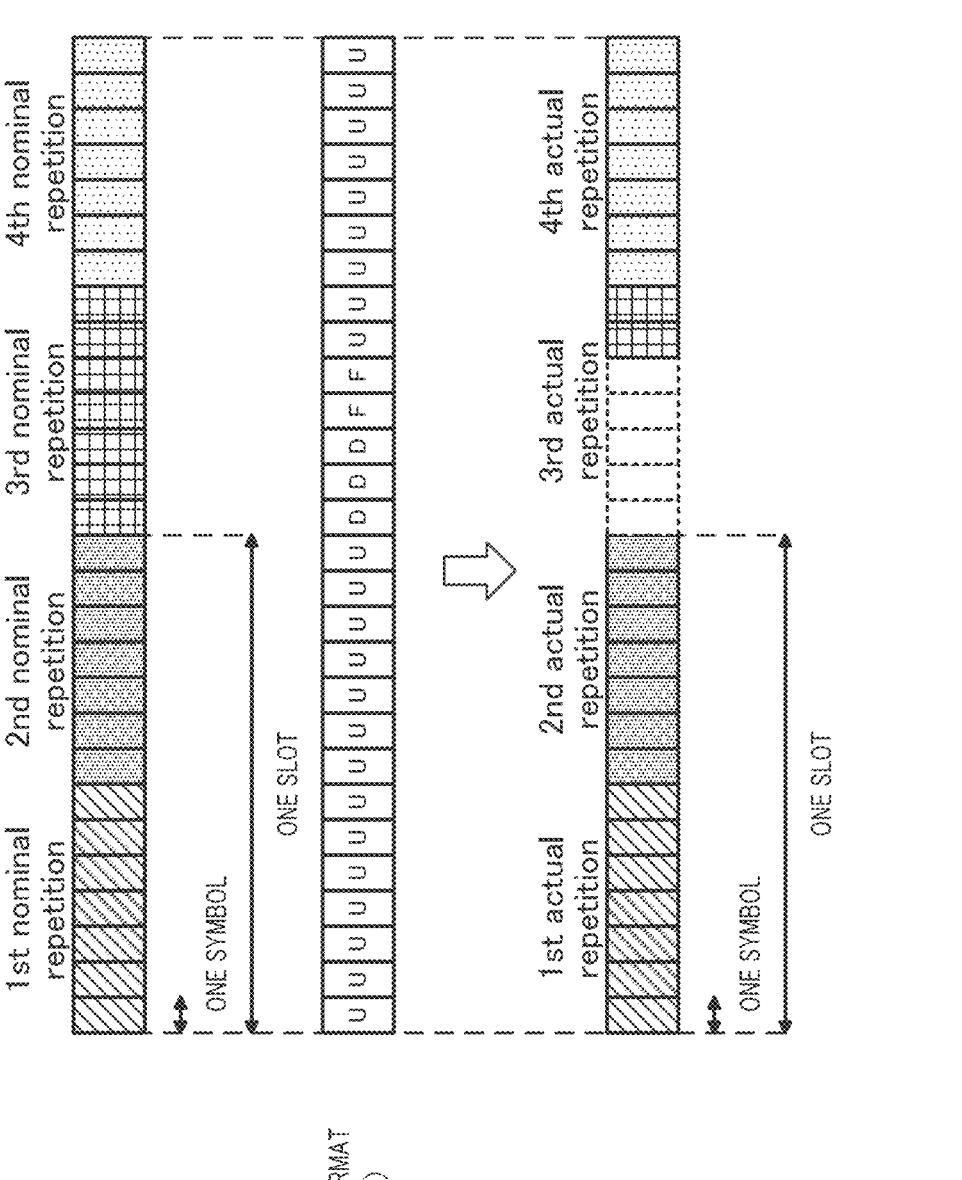
FIG. 9 illustrates still another exemplary PUSCH repetition.

FIG. 9 illustrates an exemplary time resource used for a repeated transmission of PUSCH in a case where PUSCH symbol number L=7 and repetition number K=2 are indicated to terminal 200.

In FIG. 9, for example, some symbols of the third Nominal PUSCH repetition (e.g., first to fifth symbols) are not used for the uplink transmission. In this case, terminal 200 does not transmit PUSCH (e.g., drops PUSCH transmission) in the symbols having the conflict with the uplink/downlink pattern (e.g., first to fifth symbols) in the third Nominal PUSCH repetition duration (e.g., 7 symbols). Thus, as illustrated in FIG. 9, the transmission duration (or transmission occasion) of the third Actual PUSCH repetition is configured to the remaining two symbols not having the conflict with the uplink/downlink pattern.

<PUCCH Resource Allocation>

In the present embodiment, terminal 200 may transmit one or more signals in units of PUCCH repetitions in one slot. In other words, terminal 200 may configure, for one slot, a plurality of transmission durations (e.g., durations of Nominal PUCCH repetition) that perform the repeated transmission of PUCCH (e.g., UCI).

Moreover, for example, when a conflict with the uplink/downlink pattern occurs in a transmission duration of one Nominal repetition, terminal 200 may transmit PUCCH (in other words, signal of Actual repetition) by using some symbols not having the conflict with the uplink pattern. That is, terminal 200 need not drop the transmission in units of PUCCH repetition, such as in NR Rel. 15 and Rel. 16, when the conflict with the uplink pattern occurs.

For example, in the PUCCH repetition, terminal 200 may change (or reconfigure), based on the information on the slot format (e.g., information on symbol configuration in slot), a Nominal repetition duration in which some symbols are configured as downlink symbol(s) among a plurality of Nominal repetition durations, into an Actual repetition duration including at least one symbol different from and other than the some symbols.

An exemplary method for indicating a PUCCH resource to a PUCCH repetition will be described later.

Figure 10:
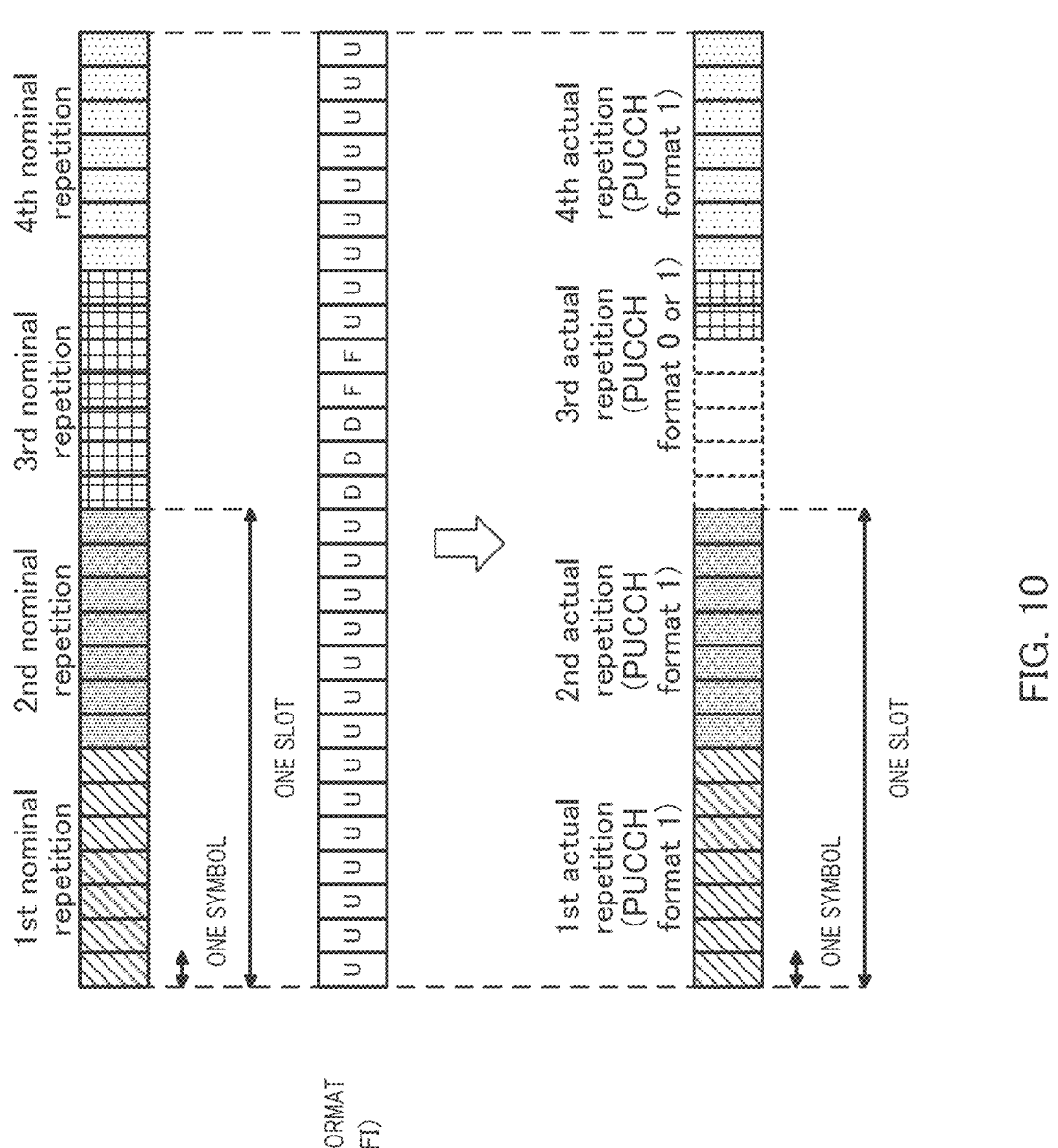
FIG. 10 illustrates an exemplary PUCCH repetition according to Embodiment 1.

FIG. 10 illustrates an exemplary time resource used for a repeated transmission of PUCCH in a case where PUCCH symbol number L=7 (e.g., PUCCH format) and repetition number K=4 are set to terminal 200 in the PUCCH repetition.

In FIG. 10, for example, some symbols of the third. Nominal repetition (e.g., first to fifth symbols) are configured as a downlink symbol or a flexible symbol and are not thus used for the uplink transmission (i.e., conflict with uplink/downlink pattern occurs).

In this case, terminal 200 determines no transmission (i.e., drop) of PUCCH in the symbols having the conflict with the uplink/downlink pattern (e.g., first to fifth symbols) in the transmission duration of the third Nominal PUSCH repetition (e.g., 7 symbols). Thus, as illustrated in FIG. 10, the transmission duration of the third Actual repetition is configured to the remaining two symbols not having the conflict with the uplink/downlink pattern.

As in the third Actual repetition of FIG. 10, in a case where the number of PUCCH symbols of the Actual repetition is small compared with the number of PUCCH symbols of the Nominal repetition, PUCCH to be transmitted in the Actual repetition may be configured by, for example, any of the following methods.

A first method (hereinafter may be referred to as "PUCCH configuration method 1") is, for example, a method for puncturing a symbol having a conflict with the uplink/downlink pattern with respect to a PUCCH resource configured in a Nominal repetition and thereby forming an Actual repetition. That is, in a case where the number of PUCCH symbols of the Actual repetition transmission duration is smaller than the number of PUCCH symbols of the Nominal repetition transmission duration, terminal 200 may puncture PUCCH symbols in the PUCCH format corresponding to the Nominal repetition.

A second method (hereinafter, may be referred to as "PUCCH configuration method 2") is, for example, a method for reconfiguring PUCCH according to the number of PUCCH symbols to be transmitted in the Actual repetition. As described above, in NR, for PUCCH, a plurality of PUCCH formats corresponding to the number of symbols (e.g., FIG. 1) is defined, for example. By way of example, in the second method, when terminal 200 transmits 1- or 2-bit PUCCH (e.g., ACK/NACK), the first, second, and fourth Actual repetitions illustrated in FIG. 10 have L=7 symbols; thus, terminal 200 transmits PUCCH based on PUCCH Format 1. By contrast, the number of symbols is two in the third Actual repetition illustrated in FIG. 10; thus, terminal 200 may transmit PUCCH based on PUCCH format 0. That is, terminal 200 may determine the PUCCH format based on the number of PUCCH symbols of an Actual repetition transmission duration.

Incidentally, in NR Rel. 15 and Rel. 16, although a PUCCH format composed of three symbols is not defined, the PUCCH format of three symbols may be newly defined.

Further, in the present embodiment, a case has been described, as an example, where the conflict with the uplink/downlink pattern occurs with respect to the PUCCH resource for the Nominal repetition, but the same operation may be applied to a case where the PUCCH resource for the Nominal repetition is included in a plurality of slots (in other words, crosses a slot boundary). For example, terminal 200 divides a Nominal repetition transmission duration extending over the plurality of slots into a plurality of Actual repetition transmission durations at the slot boundary. Terminal 200 then may configure PUCCH for each of the divided plurality of Actual repetitions based on, for example, PUCCH construction method 1 or 2 described above.

According to the present embodiment, terminal 200 configures a plurality of transmission durations that perform the PUCCH repetition in the slots. This can increase flexibility of the PUCCH resource allocation.

Further, in a case where, in the PUCCH repetition, a symbol not used for the uplink transmission (e.g., symbol having conflict with uplink/downlink pattern.) is present in a slot, terminal 200 changes the Nominal repetition duration including the symbol into the Actual repetition duration including another symbol. This allows terminal 200 to transmit more PUCCH repetition signals as compared to, for example, methods, which are defined in NR Rel. 15 and Rel. 16, in which the PUCCH transmission is not performed in a slot in a case where a symbol not used for the uplink transmission is present in the slot. As a result, the transmission quality of the PUCCH repetition can be improved. Further, according to the present embodiment, terminal 200 controls the PUCCH repetition based on the uplink/downlink pattern (e.g., information indicated by SFI). In other words, the configuration of the uplink/downlink pattern does not depend on the control of the PUCCH repetition. Therefore, according to the present embodiment, a reduction in flexibility of the uplink/downlink pattern configuration can be suppressed, and, for example, a decrease in frequency-utilization efficiency for downlink can be suppressed.

From the above, according to the present embodiment, it is possible to suppress the decrease in frequency-utilization efficiency for downlink and to improve the transmission quality in the repeated transmission of PUCCH.

Embodiment 2

In Embodiment 1, when a conflict with the uplink pattern occurs in a transmission duration of a Nominal repetition in the PUCCH repetition, PUCCH may be transmitted in, for example, a transmission duration of an Actual repetition including a symbol not having the conflict with the uplink pattern, in the Nominal repetition transmission duration. In this case, the terminal may transmit an Actual repetition signal having a different number of symbols from the Nominal repetition.

In addition, in the PUCCH repetition, as with the PUSCH repetition in Rel. 16, when a Nominal repetition transmission duration crosses a slot boundary, PUCCH may be transmitted after dividing the Nominal repetition transmission duration into a plurality of Actual repetition transmission durations. Also in this case, the terminal may transmit an Actual repetition signal having a different number of symbols from the Nominal repetition.

Here, for example, in a case where an Actual repetition is configured by a puncture for a Nominal repetition, based on PUCCH configuration method 1 described above, a reference signal for channel estimation (e.g., Demodulation Reference Signal (DMRS)) is possibly not included in the Actual repetition.

Figure 11:
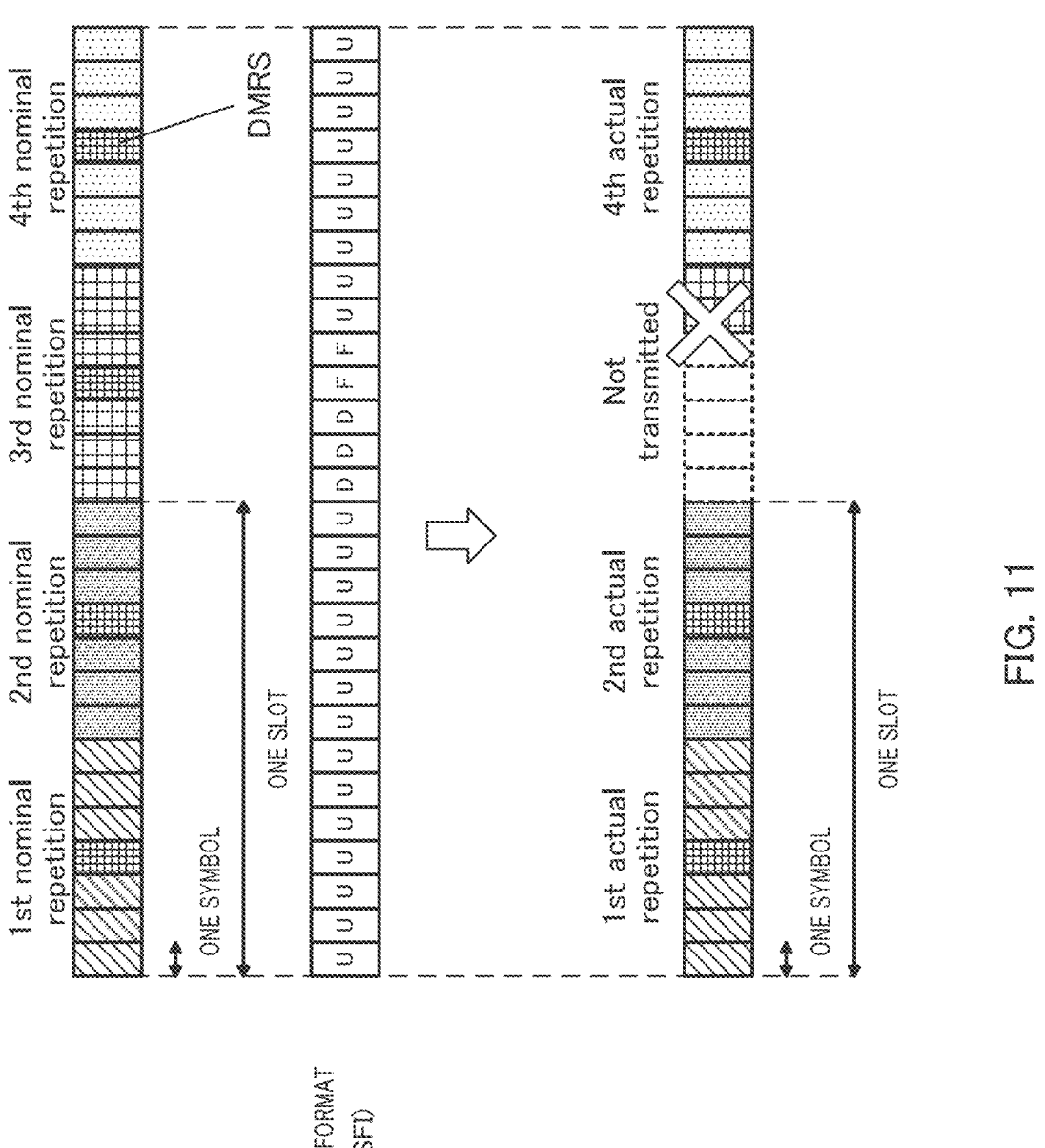
FIG. 11 illustrates an exemplary PUCCH repetition according to Embodiment 2.

FIG. 11 illustrates an exemplary time resource used for a repeated transmission of PUCCH in a case where PUCCH format 3 or PUCCH format 4 of PUCCH symbol number L=7, and repetition number K=4 are set in the PUCCH repetition.

In PUCCH format 3 or PUCCH format 4 where L=7 symbols as illustrated in FIG. 11, DMRS can be placed in the fourth symbol in each Nominal repetition transmission duration, for example.

Further, in FIG. 11, for example, some symbols of the third Nominal repetition (e.g., first to fifth symbols) are configured as a downlink symbol or a flexible symbol and are not thus used for the uplink transmission (i.e., conflict with uplink/downlink pattern occurs). In this case, for example, DMRS is not included in the remaining two symbols that can be used for the uplink transmission (e.g., sixth and seventh symbols) in the third Nominal repetition illustrated in FIG. 11; thus, the base station may fail to demodulate PUCCH.

Further, for example, in a case where PUCCH (in other words, PUCCH format) is reconfigured according to the number of PUCCH symbols of an Actual repetition transmission duration, based on PUCCH configuration method 2 described above, DMRS may be included in each symbol of the Actual repetition. On the other hand, in NR, a PUCCH format according to the number of PUCCH symbols is defined. For this reason, in this case, in the PUCCH repetition, a terminal may transmit a signal of an Actual repetition having a different PUCCH format. As a result, the following may occur.

For example, in a case where PUCCH format 1 (e.g., four to 14 symbols) is configured in a Nominal repetition, part of an Actual repetition may be configured to PUCCH format 0 (e.g., one or two symbols). Here, in PUCCH format 1, for example, up to 84 terminals can be multiplexed by using a cyclic shift sequence and a time-domain orthogonal code (OCC) for PUCCH of 14 symbols. On the other hand, in PUCCH format 0, up to six terminals can be multiplexed in one-bit UCI whereas up to three terminals can be multiplexed in two-bit UCI by using, for example, the cyclic shift sequence. Thus, when PUCCH format 1 and PUCCH format 0 coexist in a plurality of Actual repetitions, the number of terminals that can be multiplexed (hereinafter may be referred to as "multiplexable terminals") in the same time- and frequency-resource (e.g., one PRB) may differ between Actual PUCCH repetitions.

Moreover, even when PUCCH format 1 is configured in an Actual repetition while PUCCH format 1 is configured in a Nominal repetition, the number of multiplexable terminals in OCC in the time domain may differ between Actual PUCCH repetitions in a case where the number of PUCCH symbols differ.

Furthermore, for example, in a case where PUCCH format 4 (e.g., four to 14 symbols) is configured in a Nominal repetition, part of an Actual repetition may be configured to PUCCH format 2 (e.g., one or two symbols). In PUCCH format 4, for example, two terminals or four terminals can be multiplexed by using OCC whereas in PUCCH format 2, multiplexing a plurality of terminals in the same PRB is not supported. Thus, when PUCCH format 4 and PUCCH format 2 coexist in a plurality of Actual repetitions, the number of multiplexable terminals in the same time- and frequency-resource (e.g., one PRB) may differ between Actual PUCCH repetitions.

Hence, in a case where the number of multiplexable terminals in the same time- and frequency-resource (e.g., one PRB) between Actual PUCCH repetitions, PUCCH transmitted by a terminal may not be multiplexed with PUCCH of another terminal but may cause interference with respect to the other terminal (e.g., inter-terminal interference) in a certain Actual repetition transmission duration.

Further, in NR Rel. 15 and Rel. 16, a PUCCH format composed of three symbols is not defined. When the PUCCH format composed of three symbols is not newly defined, an operation of a terminal cannot be defined in an Actual repetition composed of three symbols.

Hence, in the present embodiment, a description will be given of a method for determining a PUCCH resource in a case where a PUCCH format or the number of PUCCH symbols are configured differently between Actual repetitions.

The configurations of the base station and the terminal according to the present embodiment may be the same as the configurations of base station 100 and terminal 200 according to Embodiment 1.

For example, terminal 200 may transmit a signal in units of one or more PUCCH repetitions in one slot. That is, terminal 200 may configure a plurality of Nominal PUCCH repetition transmission durations for one slot.

Moreover, for example, when a conflict with the uplink/downlink pattern occurs in a transmission duration of one Nominal repetition, terminal 200 may transmit PUCCH (in other words, signal of Actual repetition) by using some symbols not having the conflict with the uplink pattern. That is, terminal 200 need not drop the transmission in units of PUCCH repetition, such as in NR Rel. 15 and Rel. 16, when the conflict with the uplink pattern occurs.

Furthermore, in a case where a transmission duration of one Nominal repetition crosses a slot boundary, for example, terminal 200 may divide the transmission duration of the one Nominal repetition into a plurality of Actual repetition transmission durations at the slot boundary.

Further, in a case where a certain condition is satisfied in an Actual repetition transmission duration, for example, terminal 200 determines no transmission of PUCCH (i.e., does not transmit PUCCH) in the Actual repetition.

The condition may be the following: (i) PUCCH formats are different between a Nominal repetition and an Actual repetition; (ii) the number of PUCCH symbols of an Actual repetition is smaller than a threshold value; or (iii) DMRS is not included in an Actual repetition transmission duration, for example. Incidentally, for example, a different condition may be applied for each of PUCCH formats. Further, when a PUCCH format composed of three symbols is not newly defined, the condition may be that the number of PUCCH symbols of an Actual repetition is three symbols.

For example, as described above, in the example illustrated in FIG. 11, some symbols of the third Nominal repetition (e.g., first to fifth symbols) are not used for the uplink transmission, and the Actual repetition may be configured which includes the remaining two symbols (e.g., sixth and seventh symbols) that can be used for the uplink transmission.

In this case, for example, PUCCH format 2 may be configured in the configurable third Actual repetition whereas PUCCH format 3 or 4 may be configured in other Actual repetitions. That is, in the third PUCCH repetition illustrated in FIG. 11, the PUCCH format of the Nominal repetition and the PUCCH format of the Actual repetition may be different from each other, which can satisfy the above-mentioned condition (i).

In addition, for example, the number of symbols of the configurable third Actual repetition may be smaller than a threshold value (e.g., four symbols), which can satisfy the above-mentioned condition (ii).

Further, DMRS is not included in the configurable third Actual repetition, which can satisfy the above-mentioned condition (iii).

Thus, in the example illustrated in FIG. 11, terminal 200 may drop the transmission of a signal of the third Actual repetition. In other words, terminal 200 may transmit signals of the first, second, and fourth Actual repetitions and may not transmit the signal of the third Actual repetition.

Thus, according to the present embodiment, terminal 200 performs PUCCH transmission suitable for the number of PUCCH symbols of an Actual repetition. For example, in a case where the number of PUCCH symbols of an Actual repetition is not suitable for the PUCCH transmission, terminal 200 will not transmit a signal of the Actual repetition. In other words, terminal 200 may vary a PUCCH transmission operation depending on the number of PUCCH symbols of the Actual repetition. Such transmission control makes it possible to suppress a signal transmission that may cause interference with another terminal when, for example, the number of multiplexable terminals is different between Actual repetitions, and thus to suppress a performance degradation of PUCCH repetition due to the inter-terminal interference.

Incidentally, in PUCCH format 0, for example, even when a Nominal repetition is configured to two symbols while an Actual repetition is configured to one symbol, the number of multiplexable terminals by the cyclic shift sequence is not changed. Further, DMRS is not included in PUCCH format 0. Therefore, in PUCCH Format 0, terminal 200 may transmit a signal of the Actual repetition regardless of the above-mentioned conditions.

Further, in the present embodiment, a case has been described, as an example, where the conflict with the uplink/downlink pattern occurs with respect to the PUCCH resource for the Nominal repetition, but the same operation may be applied to a case where the PUCCFI resource for the Nominal repetition is included in a plurality of slots (in other words, crosses a slot boundary). For example, in a case where the above-mentioned condition(s) (e.g., at least one of conditions (i) to (iii)) is/are satisfied in a plurality of Actual repetition transmission durations after division, terminal 200 may not transmit a signal of the Actual repetition (i.e., may drop transmission).

Embodiment 3

The configurations of the base station and the terminal according to the present embodiment may be the same as the configurations of base station 100 and terminal 200 according to Embodiment 1.

In the present embodiment, for example, terminal 200 may transmit a signal in units of one or more PUCCH repetitions in one slot. That is, terminal 200 may configure a plurality of Nominal PUCCH repetition transmission durations for one slot.

Moreover, for example, when a conflict with the uplink/downlink pattern occurs in a transmission duration of one Nominal repetition, terminal 200 may transmit PUCCH (in other words, signal of Actual repetition) by using some symbols not having the conflict with the uplink/downlink pattern. That is, terminal 200 need not drop the transmission in units of PUCCH repetition, such as in NR Rel. 15 and Rel. 16, when the conflict with the uplink pattern occurs.

Furthermore, in a case where a transmission duration of one Nominal repetition crosses a slot boundary, for example, terminal 200 may divide the transmission duration of the one Nominal repetition into a plurality of Actual repetition transmission durations at the slot boundary.

Further, a PUCCH format whose defined symbol length (e.g., duration) is not greater than a threshold value may be applied to a PUCCH format corresponding to UCI in the PUCCH repetition. In other words, terminal 200 may not apply, in the PUCCH repetition, a PUCCH format whose symbol length is longer than the threshold value. As an example, terminal 200 may use Short PUCCH such as PUCCH format 0 or PUCCH format 2.

Further, in the present embodiment, for example, the number of PUCCH symbols for a Nominal repetition to be indicated or configured to/for terminal 200 is set to $L=1$ or 2. In other words, when the PUCCH repetition is configured, terminal 200 does not assume an indication of a value different from a case where $L=1$ or 2 regarding the number of PUCCH symbols for the Nominal repetition.

Figure 12:
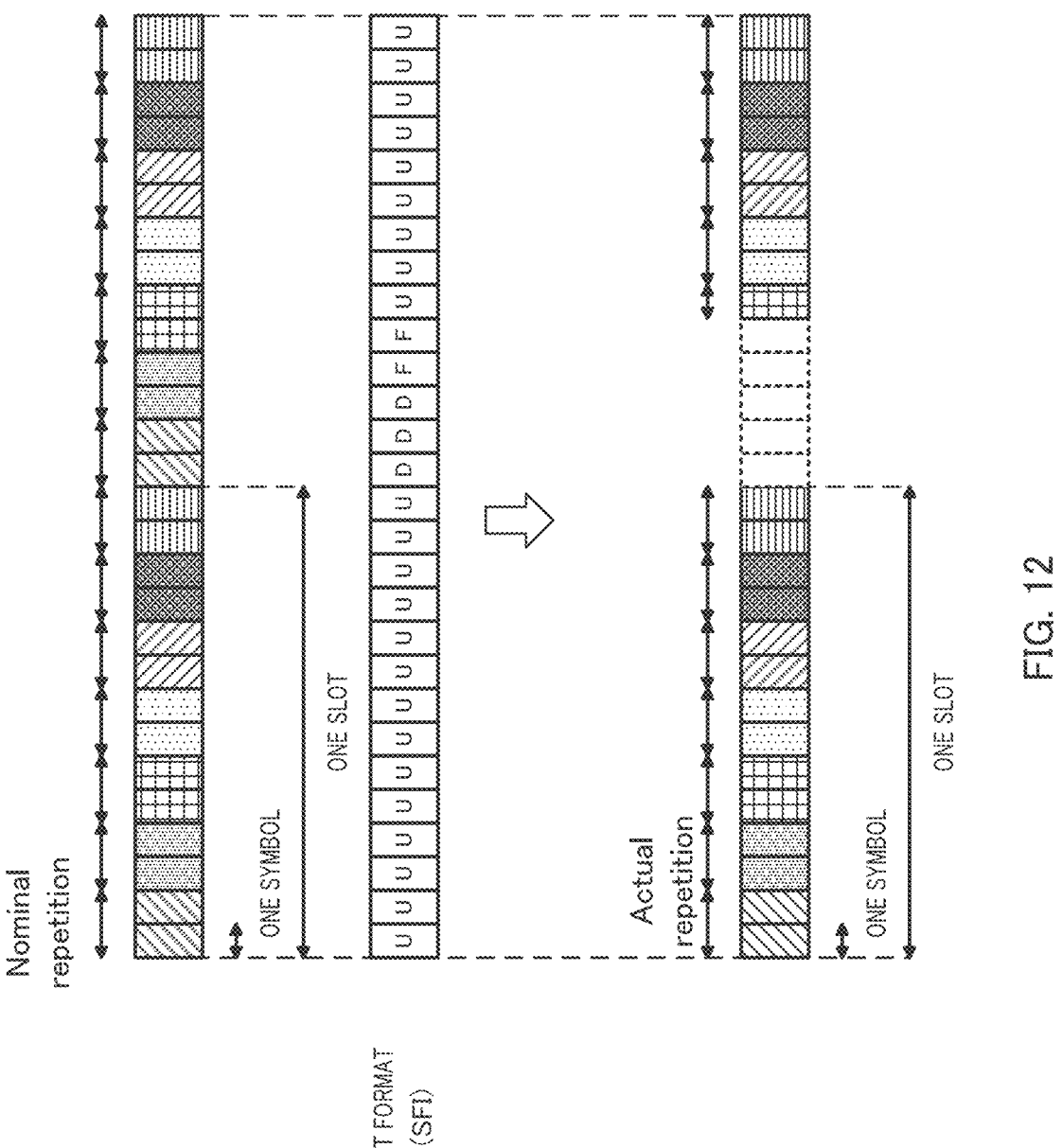
FIG. 12 illustrates an exemplary PUCCH repetition according to Embodiment 3.

FIG. 12 illustrates an exemplary time resource used for a repeated transmission of PUCCH in a case where PUCCH symbol number $L=2$ and repetition number $K=14$ are set in the PUCCH repetition.

In FIG. 12, in a Nominal repetition, for example, Short PUCCH such as PUCCH format 0 or PUCCH format 2 (e.g., one or two symbols) may be configured, and Long PUCCH such as PUCCH formats 1, 3, and 4 may not be configured.

For example, in the example illustrated in FIG. 12, transmission durations of the eighth and ninth Nominal repetitions are not used for the uplink transmission. Additionally, for example, in the example illustrated in FIG. 12, some symbols (including one symbol) of the 10th Nominal repetition (e.g., first symbol) are not used for the uplink transmission, and the Actual repetition including the remaining one symbol (e.g., second symbol) that can be used for the uplink transmission.

Here, for example, in PUCCH format 0, the number of multiplexable terminals does not depend on the number of PUCCH symbols. Thus, for example, as illustrated in FIG. 12, even when part (e.g., one symbol) of a Nominal repetition (e.g., two symbols) is configured for an Actual repetition (i.e., when number of PUCCH symbols differs), the number of multiplexable terminals is not changed between the Nominal repetition and the Actual repetition. In one example, in FIG. 12, the number of multiplexable terminals is not changed between the 10th Actual repetition (one symbol) and the other Actual repetitions (two symbols).

Meanwhile, for example, in PUCCH format 2, DMRS is included in each symbol. Thus, for example, as illustrated in FIG. 12, even when part (e.g., one symbol) of a Nominal repetition (e.g., two symbols) is configured to an Actual repetition, DMRS is included in the Actual repetition.

From the above, in the present embodiment, even when, in PUCCH repetition, the number of symbols differs between a Nominal repetition and an Actual repetition, it is possible to reduce the probability that DMRS is absent in the Actual repetition or the probability that the number of multiplexable terminals is changed. Thus, according to the present embodiment, it is possible for terminal 200 to increase the probability of transmitting a signal of an Actual repetition without dropping the transmission of the Actual repetition different in the number of symbols from the Nominal repetition. Consequently, according to the present embodiment, a performance degradation of PUCCH repetition can be suppressed, and thus, the transmission quality in PUCCH can be improved.

Note that, in the present embodiment, a case has been described, as an example, where the conflict with the uplink/downlink pattern occurs with respect to the PUCCH resource for the Nominal repetition, but the same operation may be applied to a case where the PUCCH resource for the Nominal repetition is included in a plurality of slots (in other words, crosses a slot boundary). For example, in the present embodiment, in a case where PUCCH format 0 or PUCCH format 2 is configured in a Nominal repetition, for example, as described above, even in a plurality of Actual repetitions after division, it is possible to reduce the probability that DMRS is absent or the probability that the number of multiplexable terminals is changed. Thus, terminal 200 can transmit a signal of an Actual repetition without dropping the transmission of the Actual repetition different in the number of symbols from the Nominal repetition.

Embodiment 4

The configurations of the base station and the terminal according to the present embodiment may be the same as the configurations of base station 100 and terminal 200 according to Embodiment 1.

In the present embodiment, for example, terminal 200 may transmit a signal in units of one or more PUCCH repetitions in one slot. That is, terminal 200 may configure a plurality of Nominal PUCCH repetition transmission durations for one slot.

Moreover, for example, when a conflict with the uplink/downlink pattern occurs in a transmission duration of one Nominal repetition, for example, terminal 200 may transmit PUCCH (in other words, signal of Actual repetition) by using some symbols not having the conflict with the uplink/downlink pattern. That is, terminal 200 need not drop the transmission in units of PUCCH repetition, such as in NR Rel. 15 and Rel. 16, when the conflict with the uplink pattern occurs.

Furthermore, in a case where a transmission duration of one Nominal repetition crosses a slot boundary, for example, terminal 200 may divide the transmission duration of the one Nominal repetition into a plurality of Actual repetition transmission durations at the slot boundary.

Further, as in Embodiment 3, for terminal 200, a PUCCH format whose defined symbol length (e.g., duration) is not greater than a threshold value may be applied to a PUCCH format corresponding to UCI in the PUCCH repetition. In other words, terminal 200 may not apply, in the PUCCH repetition, a PUCCH format whose symbol length is longer than the threshold value. As an example, terminal 200 may use Short PUCCH such as PUCCH format 0 or PUCCH format 2.

Further, in Embodiment 3, the number of PUCCH symbols for a Nominal repetition is L=1 or 2, but in the present embodiment, for example, the number of PUCCH symbols for a Nominal repetition to be indicated or configured to/for terminal 200 may be L>3.

A Nominal repetition transmission duration in a case where L=3 may be configured by, for example, a combination of Short PUCCHs such as PUCCH format 0 or PUCCH format 2. In other words, the Nominal repetition transmission duration in a case where L>3, for example, may be configured by, for example, a combination of symbols in units of the number of symbols corresponding to Short PUCCH. As an example, when Nominal repetition where L=7 is configured, a signal of the Nominal repetition may be composed by a combination of seven Short PUCCHs where L=one symbol.

According to the present embodiment, as described in Embodiment 3, for example, even when, in the PUCCH repetition, the number of symbols differs between a Nominal repetition and an Actual repetition as in PUCCH configuration method 1, it is possible to reduce the probability that DMRS is absent in the Actual repetition or the probability that the number of multiplexable terminals is changed. Thus, according to the present embodiment, it is possible for terminal 200 to increase the probability of transmitting, without dropping the transmission of an Actual repetition different in the number of symbols from the Nominal repetition, a signal of the Actual repetition. Consequently, according to the present embodiment, the impact of performance degradation of PUCCH repetition can be suppressed, and thus, the transmission quality in PUCCH can be improved.

In addition, in the present embodiment, in the indication or configuration relating to PUCCH symbol number L for a Nominal repetition, the PUCCH format of L>3 may be included therein. Thus, in the present embodiment, for example, as compared to Embodiment 3 (e.g., L=1 or 2), for example, a range of values for the indication (or configuration) of repetition number K can be reduced. As an example, regarding the PUCCH repetition in a duration corresponding to the two-slot length (e.g., 28 symbols), in Embodiment 3 (FIG. 12), when PUCCH symbol number L=2, the repetition number is set, K=14, and when PUCCH symbol number L=1, the repetition number is set, K=28. In contrast, in the present embodiment, for example, when PUCCH symbol number L=7, the repetition number is set, K=4, and when PUCCH symbol number L=14, the repetition number is set, K=2. Consequently, in the present embodiment, as compared to Embodiment 3, a configuration range of repetition number K can be reduced, and thus, an increase of the indication bit can be suppressed.

Variation of Embodiment 4

In Embodiment 4, a case has been described where the Nominal repetition of L>3 is configured by combining Short PUCCHs (e.g., PUCCH format 0 or PUCCH format 2).

When the PUCCH repetition is configured, terminal 200 may apply the above-mentioned method of Embodiment 4 depending on a condition, for example.

For example, in a case where, in a plurality of Actual repetitions, the number of symbols is the same as that in the Nominal repetition, terminal 200 may apply a PUCCH format corresponding to the number of symbols configured for the Nominal repetition to the Actual repetitions.

On the other hand, in a case where the number of symbols of at least one of a plurality of Actual repetitions differs from that in the Nominal repetition or not greater than a threshold value (e.g., two symbols), terminal 200 may reconfigure the Nominal repetition by a combination of Short PUCCHs, based on the method of Embodiment 4.

When the Nominal repetition is configured by the combination of Short PUCCHs, the number of multiplexable terminals may be decreased as compared to, for example, a case of using Long PUCCH. In contrast, according to the present variation, in the PUCCH repetition, terminal 200 need not configure Long PUCCH by the combination of Short PUCCHs when not transmitting the Actual repetition having a different number of symbols, which is thus advantageous in that a reduction in the number of multiplexable terminals is unnecessary.

Embodiment 5

The configurations of the base station and the terminal according to the present embodiment may be the same as the configurations of base station 100 and terminal 200 according to Embodiment 1.

In the present embodiment, for example, terminal 200 may transmit a signal in units of one or more PUCCH repetitions in one slot. That is, terminal 200 may configure a plurality of Nominal PUCCH repetition transmission durations for one slot.

Moreover, for example, when a conflict with the uplink downlink pattern occurs in a transmission duration of one Nominal repetition, terminal 200 may transmit PUCCH (in other words, signal of Actual repetition) by using some symbols not having the conflict with the uplink/downlink pattern. That is, terminal 200 need not drop the transmission in units of PUCCH repetition, such as in NR Rel. 15 and Rel. 16, when the conflict with the uplink pattern occurs.

Furthermore, in a case where a transmission duration of one Nominal repetition crosses a slot boundary, for example, terminal 200 may divide the transmission duration of the one Nominal repetition into a plurality of Actual repetition transmission durations at the slot boundary.

Further, in the PUCCH repetition, for example, terminal 200 may transmit a signal of an Actual repetition having a PUCCH format different from the PUCCH format of the Nominal repetition. For example, terminal 200 may reconfigure PUCCH (or PUCCH format) according to the number of PUCCH symbols transmitted in the Actual repetition, as in PUCCH configuration method 2 described above.

Besides, in the present embodiment, the following methods may be applied for suppressing the impact on the terminal multiplexing due to a difference in PUCCH format or the number of PUCCH symbols between Actual repetitions.

First, a case will be described where PUCCH formats are different from each other between a Nominal repetition and an Actual repetition.

By way of example, when PUCCH format 1 is configured for the Nominal repetition, a PUCCH resource includes a cyclic shift sequence number and a time-domain OCC (TD-OCC) number.

Here, the cyclic shift sequence number may be, for example, any value from 0 to 11.

The OCC number has a value range variable depending on, for example, the number of PUCCH symbols of a Nominal repetition (e.g., may be referred to as Nominal PUCCH length) and the presence or absence of intra-repetition frequency hopping (e.g., may be referred to as intra-repetition hopping). FIG. 13 illustrates an example of the number of multiplexable terminals by OCC depending on the number of PUCCH symbols of the Nominal PUCCH length (e.g., any of four to 14 symbols) and the presence or absence of intra-repetition hopping. In one example, in a case where the number of multiplexable terminals by OCC is N, the OCC number may be any value from 0 to N−1.

For example, as illustrated in FIG. 1, in PUCCH format 1, up to 36 terminals can be multiplexed without the frequency hopping whereas up to 84 terminals can be multiplexed with the frequency hopping.

Further, for example, in PUCCH format 0, as mentioned above, up to six terminals can be multiplexed in one-bit UCI (e.g., any of cyclic shift sequence numbers 0 to 5) whereas up to three terminals can be multiplexed in two-bit UCI (e.g., any of cyclic shift sequence numbers 0 to 2), by using the cyclic shift sequence. Note that, in PUCCH format 0, the terminal multiplexing by OCC number is not supported.

In the present embodiment, for example, in a case where any of cyclic shift sequence numbers 0 to 5 as well as OCC number 0 (i.e., equivalent to no terminal multiplexing by OCC) are indicated or configured to/for terminal 200, terminal 200 may transmit one-bit UCI in the Actual repetition for which PUCCH format 0 is configured. On the other hand, for example, in a case where any of cyclic shift sequence numbers 6 to 11 as well as OCC number 1 or more are indicated or configured to/for terminal 200, terminal 200 may drop the transmission of one-bit UCI in the Actual repetition for which PUCCH format 0 is configured.

Similarly, for example, in a case where any of cyclic shift sequence numbers 0 to 2 as well as OCC number 0 (i.e., equivalent to no terminal multiplexing by OCC) are indicated or configured to/for terminal 200, terminal 200 may transmit two-bit UCI in the Actual repetition for which PUCCH format 0 is configured. On the other hand, for example, in a case where any of cyclic shift sequence numbers 3 to 11 as well as OCC number 1 or more are indicated or configured to/for terminal 200, terminal 200 drop the transmission of two-bit UCI in the Actual repetition for which PUCCH format 0 is configured.

As described above, in a case where parameters (e.g., cyclic shift sequence number and OCC number) relating to the terminal multiplexing indicated or configured to/for terminal 200 are included in parameters (e.g., cyclic shift sequence number and OCC number) relating to the terminal multiplexing defined in the PUCCH format determined for an Actual repetition, terminal 200 may determine transmission of UCI in the Actual repetition transmission duration. On the other hand, in a case where the parameters (e.g., cyclic shift sequence number and OCC number) relating to the terminal multiplexing to be indicated or configured to/for terminal 200 are not included in the parameters (e.g., cyclic shift sequence number and OCC number) relating to the terminal multiplexing to be defined in the PUCCH format determined for the Actual repetition, terminal 200 may determine no transmission of UCI in the Actual repetition transmission duration.

In a PUCCH format supporting the terminal multiplexing by OCC, OCC of OCC number #0 may be, for example, a code having only code elements "+1." In this case, a signal (e.g., PUCCH) to which OCC number #0 is applied (e.g., multiplied) is not different from a signal prior to the application of OCC number #0. Therefore, for example, as to PUCCH format 0 not supporting the terminal multiplexing by OCC, even when OCC number #0 is indicated or configured to/for terminal 200, it may be regarded as being equivalent to no terminal multiplexing by OCC. The same applies not only to PUCCH format 0 but also to another PUCCH format (e.g., PUCCH format 2) not supporting the terminal multiplexing by OCC.

Figure 14:
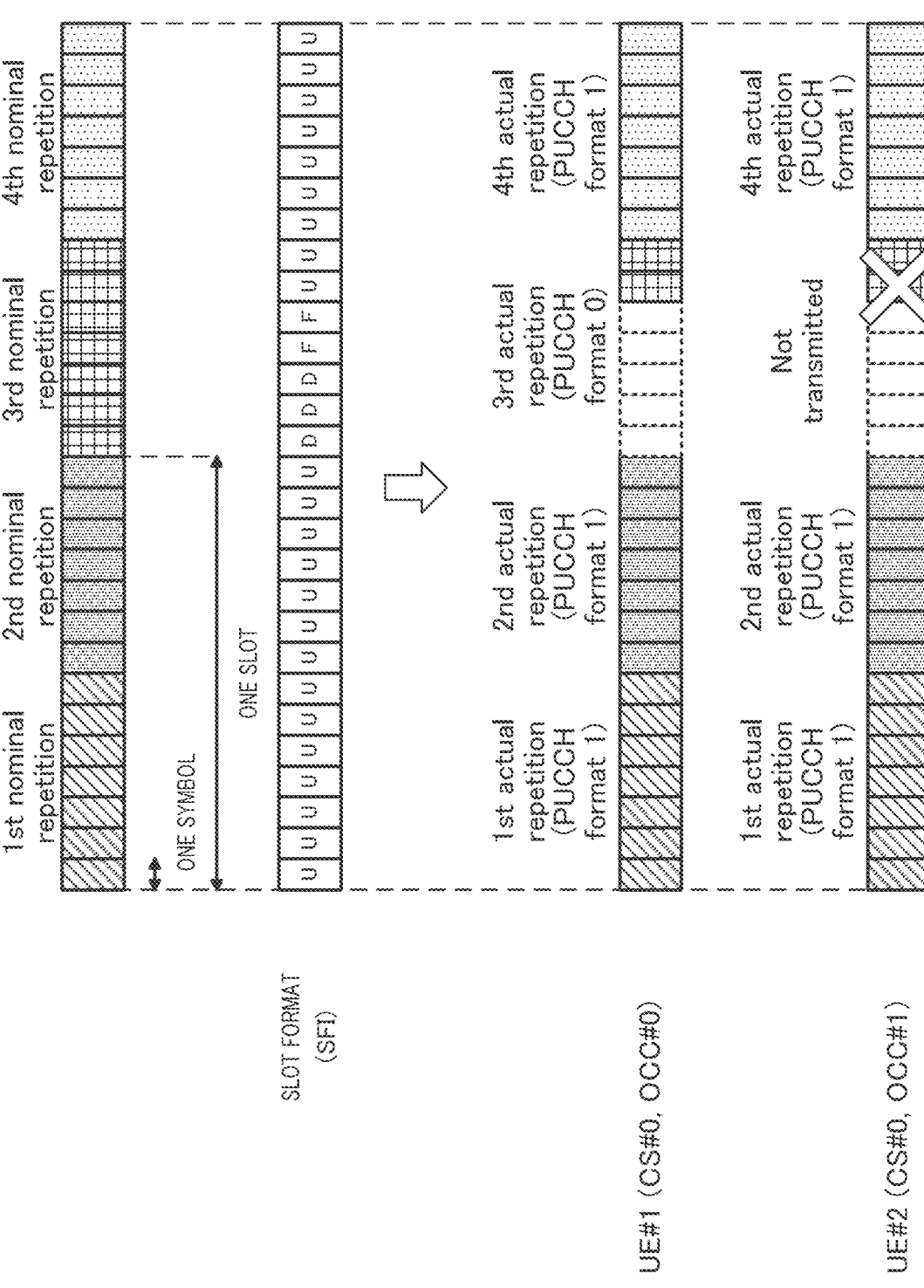
FIG. 14 illustrates an exemplary PUCCH repetition according to Embodiment 5.

FIG. 14 illustrates an exemplary time resource used for a repeated transmission of PUCCH in a case where PUCCH symbol number L=7 and the repetition number K=4 are set to two terminals 200 (e.g., UE #1 and UE #2) in the PUCCH repetition.

In FIG. 14, for example, cyclic shift sequence number #0 and OCC number #0 are configured for UE #1 whereas cyclic shift sequence number #0 and OCC number #1 are configured for UE#2.

For example, in FIG. 14, some symbols of the third Nominal repetition (e.g., first to fifth symbols) are configured as a downlink symbol or a flexible symbol and are not thus used for the uplink transmission (i.e., conflict with uplink/downlink pattern occurs). In this case, for example, in the third Nominal repetition illustrated in FIG. 14, the Actual repetition having PUCCH format 0 may be configured which includes the remaining two symbols (e.g., sixth and seventh symbols) that can be used for the uplink transmission.

In FIG. 14, for example, since cyclic shift sequence number #0 and OCC number #0 (where OCC number #0 is equivalent to no terminal multiplexing by OCC), which are defined in PUCCH format 0 are configured for UE #1, UE #1 may transmit signals of the first to fourth Actual repetitions. That is, a signal transmitted from UE #1 can be multiplexed between terminals even when PUCCH format 0 of the third Actual repetition is different from the PUCCH format 1 of the Nominal repetition.

On the other hand, in FIG. 14, for example, since OCC number #1 not defined in PUCCH format 0 is configured for UE #2, UE #2 may drop the transmission of a signal of the third Actual repetition. In FIG. 14, the terminal multiplexing by OCC number configured for UE #2 is not supported in PUCCH format 0 configured for the third Actual repetition of UE #2, and thus, a signal of the Actual repetition may cause interference with another terminal. Hence, not transmitting, by UE #2, the signal of the Actual repetition enables suppression of the interference given from UE #2 to another UE inter-terminal interference).

Meanwhile, as another example, in a case where PUCCH format 4 is configured for a Nominal repetition, a PUCCH resource includes an OCC number (e.g., frequency-domain OCC (FD-OCC). Here, the OCC number is any value from 0 to 1 (i.e., number of multiplexable terminal is two) or 0 to 3 (i.e., number of multiplexable terminal is four).

Further, for example, the terminal multiplexing by OCC number is not supported in PUCCH format 2.

In this case, for example, when OCC number 0 (i.e., equivalent to no terminal multiplexing by OCC) is indicated or configured to/for terminal 200, terminal 200 may transmit UCI in the Actual repetition for which PUCCH format 2 is configured.

On the other hand, when OCC number either of 1 or 1 to 3 is indicated or configured to/for terminal 200, terminal 200 may drop the transmission of UCI in the Actual repetition for which PUCCH format 2 is configured. Since the terminal multiplexing by OCC number is not supported in PUCCH format 2, a signal of the Actual repetition having PUCCH format 2 transmitted from terminal 200 for which OCC number 1 or more is configured may cause interference with respect to another terminal. Hence, not transmitting, by terminal 200, a signal of the Actual repetition haying PUCCH format 2 enables suppression of the interference given from terminal 200 to another UE (e.g., inter-terminal interference).

Next, a case will be described where a PUCCH symbol differs between a Nominal repetition and an Actual repetition.

For example, PUCCH format 1 may be configured for an Actual repetition while PUCCH format 1 is configured for an Nominal repetition, which may cause a situation where the number of PUCCH symbols may differ. As mentioned above, when the number of PUCCH symbols differ, as illustrated in FIG. 13, the number of multiplexable terminals by OCC may also differ.

Thus, in the present embodiment, for example, in a case where the OCC number indicated or configured to/for terminal 200 is included in the OCC number defined in PUCCH format 1 according to the number of PUCCH symbols of an Actual repetition (e.g., FIG. 13), terminal 200 may transmit UCI in the Actual repetition. On the other hand, in a case where the OCC number indicated or configured to/for terminal 200 is not included in the OCC number defined in PUCCH format 1, terminal 200 may drop the transmission of UCI in the Actual repetition.

By way of example, a case will be described where PUCCH format 1 of 14 symbols is configured for a Nominal repetition and PUCCH format 1 of seven symbols is configured for an Actual repetition. As illustrated in FIG. 13, in a case where the number of PUCCH symbols is seven in PUCCH format 1, the number of multiplexable terminals is three, and the OCC number is any value from 0 to 2.

When any of OCC numbers 0 to 2 is indicated or configured to/for terminal 200, terminal 200 may transmit UCI in the Actual repetition having seven PUCCH symbols. On the other hand, when any of OCC numbers 3 to 6 is indicated or configured to/for terminal 200, terminal 200 may not transmit UCI in the Actual repetition having seven PUCCH symbols. As illustrated in FIG. 13, since the terminal multiplexing by OCC with OCC number 3 or more is not supported in PUCCH format 1 having seven PUCCH symbols, a signal of the Actual repetition having seven PUCCH symbols transmitted from terminal 200 for which these OCCs are configured may cause interference with respect to another terminal. Hence, not transmitting, by terminal 200, the signal of this Actual repetition enables suppression of the interference given from terminal 200 to another UE (e.g., inter-terminal interference).

Thus, according to the present embodiment, terminal 200 can adjust the number of multiplexable terminals in an Actual repetition based on the PUCCH format in the Actual repetition and the number of PUCCH symbols of the Actual repetition, and thus, a performance degradation of PUCCH repetition due to the inter-terminal interference can be suppressed.

In addition, in the present embodiment, some of terminals 200 (e.g., UE #1 in FIG. 14) can transmit UCI without dropping the transmission of the Actual repetition, so that the transmission quality of the PUCCH repetition can be improved.

Note that, in the present embodiment, a case has been described, as an example, where the conflict with the uplink/downlink pattern occurs with respect to the PUCCH resource for the Nominal repetition, but the same operation may be applied to a case where the PUCCH resource for the Nominal repetition is included in a plurality of slots (in other words, crosses a slot boundary). For example, in the present embodiment, terminal 200 may determine, in the plurality of Actual Repetitions after division, whether the terminal multiplexing is possible based on the parameters indicated or configured to/for terminal 200, and thereby may control the transmission of the Actual Repetitions.

Further, in NR Rel. 15 and Rel. 16, although a PUCCH format composed of three symbols is not defined, the PUCCH format of three symbols may be newly defined. For example, the PUCCH format of three symbols may be existing Short PUCCH (e.g., PUCCH format 0 and PUCCH format 2) or may be Long PUCCH (e.g., PUCCH format 1, PUCCH format 3, and PUCCH format 4). Further, in a case where the PUCCH format composed of three symbols is not newly defined while the number of PUCCH symbols of an Actual repetition is three symbols, terminal 200 may not transmit the Actual repetition.

Embodiment 6

The configurations of the base station and the terminal according to the present embodiment may be the same as the configurations of base station 100 and terminal 200 according to Embodiment 1.

In the present embodiment, for example, terminal 200 may transmit a signal in units of one or more PUCCH repetitions in one slot. That is, terminal 200 may configure a plurality of Nominal PUCCH repetition transmission durations for one slot.

Moreover, for example, when a conflict with the uplink/downlink pattern occurs in a transmission duration of one Nominal repetition, terminal 200 may transmit PUCCH (in other words, signal of Actual repetition) by using some symbols not having the conflict with the uplink/downlink pattern. That is, terminal 200 need not drop the transmission in units of PUCCH repetition, such as in NR Rel. 15 and Rel. 16, when the conflict with the uplink pattern occurs.

Furthermore, in a case where a transmission duration of one Nominal repetition crosses a slot boundary, for example, terminal 200 may divide the transmission duration of the one Nominal repetition into a plurality of Actual repetition transmission durations at the slot boundary.

Further, as in Embodiment 5, in the PUCCH repetition, for example, terminal 200 may transmit a signal of an Actual repetition having a PUCCH format different from the PUCCH format of the Nominal repetition. For example, terminal 200 may reconfigure PUCCH (or PUCCH format) according to the number of PUCCH symbols transmitted in the Actual repetition, as in PUCCH configuration method 2 described above.

Besides, in the present embodiment, the following methods may be applied for suppressing the impact on the terminal multiplexing due to a difference in PUCCH format or the number of PUCCH symbols between Actual repetitions.

For example, in Embodiment 5, a description has been given of the case where the transmission or no transmission of the Actual repetition is determined based on the parameters such as the cyclic shift sequence number and the OCC number indicated or configured to/for terminal 200, in a case where the PUCCH format or the number of symbols of the Actual repetition is different from that in the Nominal repetition. In this case, in a terminal where no Actual repetition is transmitted (i.e., terminal not multiplexed by cyclic shifting sequences and OCC in Actual repetition), characteristics of PUCCH repetition may be deteriorated.

Therefore, in the present embodiment, a signal of the terminal not multiplexed by the cyclic shift sequence and OCC in the Actual repetition is frequency-multiplexed (Frequency Division Multiplexing: FDM). For example, terminal 200 may transmit, in the Actual repetition transmission duration, a signal of the Actual repetition at PRB (or PRB position) associated with the indicated or configured cyclic shift sequence number or OCC number.

By way of example, when PUCCH format 1 is configured for the Nominal repetition, a PUCCH resource may include PRB number n, a cyclic shift sequence number and a time-domain OCC number.

Here, the cyclic shift sequence number may be any value from 0 to 11.

The OCC number has a value range variable depending on, for example, the number of PUCCH symbols of a Nominal repetition and the presence or absence of intra-repetition frequency hopping. In one example, in a case where the number of multiplexable terminals by OCC is N, the OCC number may be any value from 0 to N−1.

Further, for example, in PUCCH format 0, as mentioned above, up to six terminals can be multiplexed in one-bit UCI (e.g., any of cyclic shift sequence numbers 0 to 5) whereas up to three terminals can be multiplexed in two-bit UCI (e.g., any of cyclic shift sequence numbers 0 to 2), by using the cyclic shift sequence. Note that, in PUCCH format 0, the terminal multiplexing by OCC number is not supported.

In the present embodiment, for example, in a case where any of cyclic shift sequence numbers 0 to 5 as well as OCC number 0 (i.e., equivalent to no terminal multiplexing by OCC) are indicated or configured to/for terminal 200, terminal 200 may transmit, at PRB of PRB number n, a signal of the Actual repetition for which PUCCH format 0 is configured.

On the other hand, for example, in a case where any of cyclic shift sequence numbers 6 to 11 as well as OCC number 1 or more are indicated or configured to/for terminal 200, terminal 200 may transmit, at PRB of different PRB number from PRB number n, a signal of the Actual repetition for which PUCCH format 0 is configured. For example, in a case where any of cyclic shift sequence numbers 6 to 11 as well as OCC number 0 are indicated or configured, terminal 200 may transmit a signal of the Actual repetition for which PUCCH format 0 is configured at PRB of PRB number n+1. In addition, in a case where any of cyclic shift sequence numbers 0 to 5 as well as OCC number 1 are indicated or configured, terminal 200 may transmit a signal of the Actual repetition for which PUCCH format 0 is configured at PRB of PRB number n+2. Further, in a case where any of cyclic shift sequence numbers 6 to 11 as well as OCC number 1 are indicated or configured, terminal 200 may transmit a signal of the Actual repetition for which PUCCH format 0 is configured at PRB of PRB number n+3.

Thus, in a case where the parameter relating the terminal multiplexing and indicated or configured to/for terminal 200 (e.g., cyclic shift sequence number and OCC number) is not included in the parameter relating the terminal multiplexing defined in the PUCCH format for the Actual repetition (e.g., cyclic shift sequence number and OCC number), terminal 200 may transmit, in the Actual repetition, UCI by using PRB associated with the parameter indicated or configured to/for terminal 200.

Incidentally, the association between the PRB number on one hand and the cyclic shift sequence number and the OCC number on the other hand is not limited to the above-mentioned example, and for example, it is acceptable as long as the PRB number is determined based on the cyclic shift sequence number and the OCC number.

Figure 15:
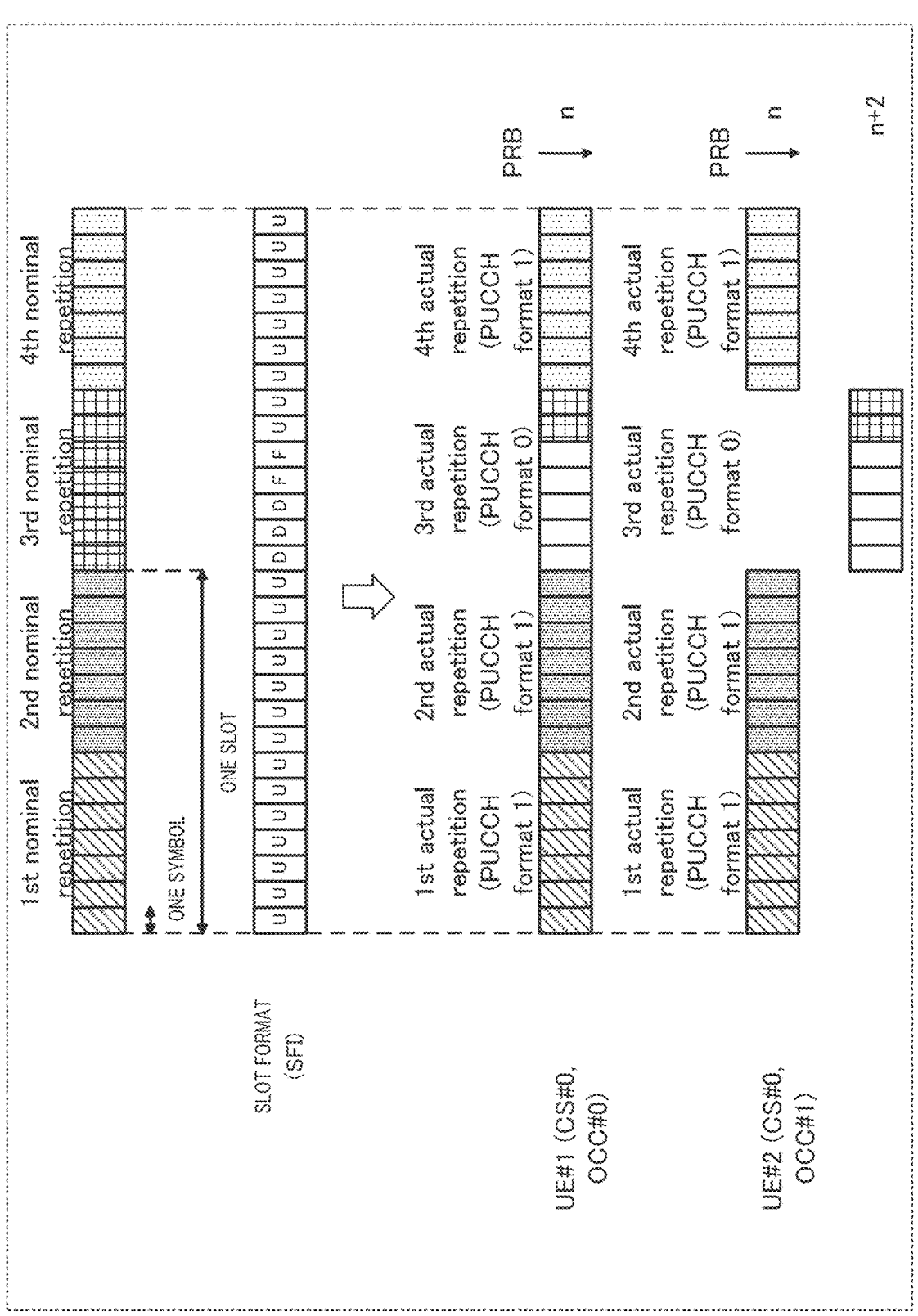
FIG. 15 illustrates an exemplary PUCCH repetition according to Embodiment 6.

FIG. 15 illustrates an exemplary time resource used for a repeated transmission of PUCCH in a case where PUCCH symbol number L=7 and the repetition number K=4 are set to two terminals 200 (e.g., UE #1 and UE #2) in the PUCCH repetition.

In FIG. 15, for example, cyclic shift sequence number #0 and OCC number #0 are configured for UE #1 whereas cyclic shift sequence number #0 and OCC number #1 are configured for UE #2.

For example, in FIG. 15, some symbols of the third Nominal repetition (e.g., first to fifth symbols) are configured as a downlink symbol or a flexible symbol and are not thus used for the uplink transmission (i.e., conflict with uplink/downlink pattern occurs). In this case, for example, in the third Nominal repetition illustrated in FIG. 15, the Actual repetition having PUCCH format 0 may be configured which includes the remaining two symbols (e.g., sixth and seventh symbols) that can be used for the uplink transmission.

In FIG. 15, for example, since cyclic shift sequence number #0 and OCC number #0 (equivalent to no terminal multiplexing by OCC), which are defined in PUCCH format 0 are configured for UE #1, UE #1 may transmit, at PRB of PRB number n, signals of the first to fourth Actual repetitions. That is, a signal transmitted from UE #1 can be multiplexed between terminals even when PUCCH format 0 of the third Actual repetition is different from the PUCCH format 1 of the Nominal repetition.

Further, in FIG. 15, for example, OCC number #1 not defined in PUCCH format 0 is configured for UE #2. Thus, for example, UE #2 may transmit signals of the first, second, and fourth Actual repetitions having PUCCH format 1 at PRB of PRB number n, and may transmit a signal of the third Actual repetition at PRB of PRB number n+2 associated with, for example, cyclic shift sequence number 0 and OCC number 1.

In FIG. 15, since the terminal multiplexing by the OCC number configured for UE #2 is not supported in PUCCH format 0 to be configured for the third Actual repetition of UE #2, a signal of the Actual repetition may cause interference with respect to another terminal when the signal transmitted at, for example, PRB of PRB number n. In contrast, in the present embodiment, since the signal of the third Actual repetition of UE #2 is transmitted at PRB different from PRB of PRB number n at which a signal of another Actual repetition is transmitted. As a result, the interference given from UE #2 to another UE (e.g., inter-terminal interference) can be suppressed, and the transmission quality of PUCCH for UE #2 can be thus improved.

Further, as another example, in a case where PUCCH format 4 is configured for the Nominal repetition, a PUCCH resource includes an OCC number (e.g., FD-OCC). Here, the OCC number is any value from 0 to 1 (i.e., number of multiplexable terminals is two) or from 0 to 3 (i.e., number of multiplexable terminals is four).

Further, for example, the terminal multiplexing by OCC number is not supported in PUCCH format 2.

In this case, for example, when OCC number 0 (i.e., equivalent to no terminal multiplexing by OCC) is indicated or configured to/for terminal 200, terminal 200 may transmit, at PRB of PRB number n, a signal of the Actual repetition for which PUCCH format 2 is configured.

On the other hand, when OCC number either of 1 or 1 to 3 is indicated or configured to/for terminal 200, terminal 200 may transmit a signal of the Actual repetition for which PUCCH format 2 is configured, at PRB different from PRB of RB number n (e.g., PRB number n+1)

Incidentally, the association between the PRB number and the OCC number is not limited to the above-mentioned examples, and for example, it is acceptable as long as the PRB number is determined based on the OCC number.

Thus, according to the present embodiment, regardless of the indicated or configured parameters (e.g., cyclic shift sequence number and OCC number) relating to the terminal multiplexing, terminal 200 can transmit the signal of the Actual repetition without dropping the transmission of the Actual repetition. As a result, the transmission quality of the PUCCH repetition can be improved.

Note that, in the present embodiment, the same operation may be applied to a case where a PUCCH symbol differs between a Nominal repetition and an Actual repetition. Further, in the present embodiment, a case has been described, as an example, where the conflict with the uplink/downlink pattern occurs with respect to the PUCCH resource for the Nominal repetition, but the same operation may be applied to a case where the PUCCH resource for the Nominal repetition is included in a plurality of slots (in other words, crosses a slot boundary). For example, in the present embodiment, terminal 200 may determine, in the Actual repetition, any of the multiplexed transmission by the cyclic shift sequence and OCC and the frequency-multiplexed transmission, based on the parameters indicated or configured to/for terminal 200

Further, in NR Rel. 15 and Rel. 16, although a PUCCH format composed of three symbols is not defined, the PUCCH format of three symbols may be newly defined. For example, the PUCCH format of three symbols may be existing Short PUCCH (e.g., PUCCH format 0 and PUCCH format 2) or may be Long PUCCH (e.g., PUCCH format 1, PUCCH format 3, and PUCCH format 4). Further, in a case where the PUCCH format composed of three symbols is not newly defined while the number of PUCCH symbols of an Actual repetition is three symbols, terminal may not transmit the Actual repetition.

Embodiment 7

The configurations of the base station and the terminal according to the present embodiment may be the same as the configurations of base station 100 and terminal 200 according to Embodiment 1.

In the present embodiment, for example, terminal 200 may transmit a signal in units of one or more PUCCH repetitions in one slot. That is, terminal 200 may configure a plurality of Nominal PUCCH repetition transmission durations for one slot.

Moreover, for example, when a conflict with the uplink/downlink pattern occurs in a transmission duration of one Nominal repetition, terminal 200 may transmit PUCCH (in other words, signal of Actual repetition) by using some symbols not having the conflict with the uplink/downlink pattern. That is, terminal 200 need not drop the transmission in units of PUCCH repetition, such as in NR Rel. 15 and Rel. 16, when the conflict with the uplink pattern occurs.

Furthermore, in a case where a transmission duration of one Nominal repetition crosses a slot boundary, for example, terminal 200 may divide the transmission duration of the one Nominal repetition into a plurality of Actual repetition transmission durations at the slot boundary.

Further, as in Embodiment 5, in the PUCCH repetition, for example, terminal 200 may transmit a signal of an Actual repetition having a PUCCH format different from the PUCCH format of the Nominal repetition. For example, terminal 200 may reconfigure PUCCH (or PUCCH format) according to the number of PUCCH symbols transmitted in the Actual repetition, as in PUCCH configuration method 2 described above.

Besides, in the present embodiment, the following methods may be applied for suppressing the impact on the PUCCH decoding due to a difference in PUCCH format or the number of PUCCH symbols between Actual repetitions.

For example, in a case where PUCCH format 3 or PUCCH format 4 is configured for a Nominal repetition, encoding (e.g., channel encoding) may be applied to a UCI bit and the encoded UCI bit may be mapped to the number of time- and frequency-resources based on PUCCH symbols. Further, for example, in a case where PUCCH format 2 is configured or the same PUCCH format as that for the Nominal repetition is configured for an Actual repetition, but the number of symbol is different, the amount of the number of time- and frequency-resources based on PUCCH symbols may be reduced as compared to the Nominal repetition. Accordingly, a coding rate of PUCCH transmitted in the Actual repetition becomes high, which may cause deterioration in the transmission characteristics.

Thus, in the present embodiment, terminal 200 may transmit, in the Actual repetition, a signal of the Actual repetition by increasing a frequency resource (e.g., number of PRBs or PRB size) as compared to the Nominal repetition.

For example, in a case where PUCCH format 3 is configured for the Nominal repetition, a PUCCH resource may include PRB number n and the number of PRBs. In the present embodiment, for example, terminal 200 may transmit, in the Actual repetition for which PUCCH format 2 is configured, a signal of the Actual repetition by increasing the number of PRBs as compared to the Nominal repetition.

Further, for example, in a case where PUCCH format 4 is configured for the Nominal repetition, the number of PRBs in a PUCCH resource is one PRB. In the present embodiment, for example, terminal 200 may transmit, in the Actual repetition for which PUCCH format 2 is configured, a signal of the Actual repetition by increasing the number of PRBs as compared to the Nominal repetition.

Incidentally, the number of PRBs in the Actual repetition may be, for example, configured as the number of PRBs capable of achieving the coding rate in the Nominal repetition, or may be a value determined based on at least one of the number of symbols of the Nominal repetition and the number of symbols of the Actual repetition.

Thus, according to the present embodiment, terminal 200 can suppress deterioration in the encoding characteristics of an Actual repetition even when a PUCCH format and the number of symbols differ between a Nominal repetition and an Actual repetition.

Note that, in the present embodiment, although a case has been described, as an example, where a PUCCH format differs between a Nominal repetition and an Actual repetition, the same operation may be also applied to, for example, a case where the number of PUCCH symbols differs between the Nominal repetition and the Actual repetition. Further, in the present embodiment, a case has been described, as an example, where the conflict with the uplink/downlink pattern occurs with respect to the PUCCH resource for the Nominal repetition, but the same operation may be applied to a case where the PUCCH resource for the Nominal repetition is included in a plurality of slots (in other words, crosses a slot boundary). For example, in the present embodiment, terminal 200 may transmit, in the Actual repetition, a signal of the Actual repetition by increasing the number of PRBs as compared to the Nominal repetition Further, in NR Rel. 15 and Rel. 16, although a PUCCH format composed of three symbols is not defined, the PUCCH format of three symbols may be newly defined. For example, the PUCCH format of three symbols may be existing Short PUCCH (e.g., PUCCH format 0 and PUCCH format 2) or may be Long PUCCH (e.g., PUCCH format 1, PUCCH format 3, and PUCCH format 4). Further, in a case where the PUCCH format composed of three symbols is not newly defined while the number of PUCCH symbols of an Actual repetition is three symbols, terminal 200 may not transmit the Actual repetition.

The embodiments according to an exemplary embodiment of the present disclosure have been described thus far.

Other Embodiments

[Indication Method for PUCCH Resource to PUCCH Repetition]

A description will be given of methods for indicating PUCCH resource and the number of Repetitions to a PUCCH repetition, Note that, a PUCCH resource to be indicated or configured by the following methods is, for example, the PUCCH resource for the "Nominal repetition" in the embodiments described above. For example, after determining the PUCCH resource for the Nominal repetition, terminal 200 may determine the PUCCH resource for the Actual repetition based on the information on the uplink/downlink pattern of a slot or on a slot boundary, and may transmit a signal of the PUCCH repetition.

<Option 0>

In Option 0, for example, with respect to identification of a PDSCH resource for transmitting ACK/NACK to the PUCCH assigned by DCI, base station 100 may indicate, to terminal 200, a union of semi-static PUCCH resources (e.g., referred to as PUCCH resource set) by using an UE-specific higher-layer signaling (e.g., RRC signal), and may indicate, to terminal 200, a PUCCH resource to be used by terminal 200 among a plurality of PUCCH resources included in the PUCCH resource set by using DCI.

Here, the PUCCH resource may be configured with, for example, parameters such as a PUCCH format, a time resource (e.g., symbol position or number of symbols), a frequency resource (e.g., PRB number, number of PRBs, and/or whether to apply frequency hopping), and a code resource (e.g., cyclic shift sequence number or orthogonal code number).

Further, in Option 0, for example, with respect to identification of a PUCCH resource for transmitting SR or CSI, base station 100 may semi-statically indicate, to terminal 200, a PUCCH resource by using an UE-specific higher-layer signaling (e.g., RRC signal).

Further, in Option 0, with respect to identification of the information on the presence or absence of PUCCH repetition and the number of repetitions, for example, base station 100 may semi-statically indicate the information to terminal 200 by using an UE-specific higher-layer signaling (e.g., RRC signal).

In Option 0, base station 100 may indicate, to terminal 200, PUCCH resource allocation for the first (i.e., initial) PUCCH transmission and the number of repetitions, for example. Additionally, the same PUCCH resource in the contiguous slot may be allocated as PUCCH resources for the second and subsequent PUCCH transmissions. Further, contiguous and the same number of symbols as the last PUCCH transmission may be assigned as the time resource allocation.

<Option 1>

In Option 1, for example, with respect to identification of a PDSCH resource for transmitting ACK/NACK to the PUCCH assigned by DCI, base station 100 may indicate, to terminal 200, a union of semi-static PUCCH resources (e.g., PUCCH resource set) by using an UE-specific higher-layer signaling (e.g., RRC signal), and may indicate, to terminal 200, a PUCCH resource to be used by terminal 200 among a plurality of PUCCH resources included in the PUCCH resource set by using DCI.

Here, the PUCCH resource may be configured with, for example, parameters such as a PUCCH format, a time resource (e.g., symbol position or number of symbols), a frequency resource (e.g., PRB number, number of PRBs, and/or whether to apply frequency hopping), and a code resource (e.g., cyclic shift sequence number or orthogonal code number).

In Option 1, the parameters configuring the PUCCH resource may further include, for example, information on the presence or absence of PUCCH repetition or information on the number of repetitions.

Further, in Option 1, for example, with respect to identification of a PUCCH resource for transmitting SR or CSI, base station 100 may semi-statically indicate, to terminal 200, a PUCCH resource by using an UE-specific higher-layer signaling (e.g., RRC signal).

In Option 1, base station 100 may indicate, to terminal 200, PUCCH resource allocation for the first (i.e., initial) PUCCH transmission and the number of repetitions, for example. Additionally, the same PUCCH resource in the contiguous slot may be allocated as PUCCH resources for the second and subsequent PUCCH transmissions. Further, contiguous and the same number of symbols as the last PUCCH transmission may be assigned as the time resource allocation.

According to Option 1, base station 100 can dynamically indicate, to terminal 200, at least one of the presence or absence of PUCCH repetition and the number of repetitions.

In addition, including, in the PUCCH resource set, the information on the presence or absence of PUCCH repetition and the number of repetitions allows base station 100 to perform, by the same bit field of DCI (e.g., PUCCH resource indicator (PRI)), a dynamic indication of at least one of the presence or absence of PUCCH repetition and the number of repetitions, and an indication of the PUCCH resource as a result, an increase in the number of DCI bits can be suppressed.

<Option 2>

In Option 2, for example, with respect to identification of a PDSCH resource for transmitting ACK/NACK to the PUCCH assigned by DCI, base station 100 may indicate, to terminal 200, a union of semi-static PUCCH resources (e.g., PUCCH resource set) by using an UE-specific higher-layer signaling (e.g., RRC signal), and may indicate, to terminal 200, a PUCCH resource to be used by terminal 200 among a plurality of PUCCH resources included in the PUCCH resource set by using DCI.

Here, the PUCCH resource may be configured with, for example, parameters in each repetition, such as a PUCCH format, a time resource (e.g., symbol position or number of symbols), a frequency resource (e.g., PRB number, number of PRBs, and/or whether to apply frequency hopping), and a code resource (e.g., cyclic shift sequence number or orthogonal code number).

Further, the parameters configuring the PUCCH resource may include, for example, information on the presence or absence of PUCCH repetition or information on the number of repetitions in each repetition.

Further, in Option 2, for example, with respect to identification of a PUCCH resource for transmitting SR or CSI, base station 100 may semi-statically indicate, to terminal 200, a PUCCH resource by using an UE-specific higher-layer signaling (e.g., RRC signal).

According to Option 2, base station 100 indicates, to terminal 200, the PUCCH resource allocation and the number of repetitions for the PUCCH transmission, for each of Repetitions. Thus, for example, base station 100 can indicate a PUCCH resource different for each of PUCCH repetitions, and thereby the flexibility of PUCCH transmission for terminal 200 can be improved.

<Option 3>

In Option 3, for example, with respect to the indication of the PUCCH resource for transmitting ACK/NACK to PDSCH assigned by DCI, any of the above-mentioned methods of Option 0 to 2 may be used.

In Option 3, base station 100 may, for example, indicate information .g., pattern) on an invalid symbol for the semi-static PUCCH repetition by an UE-specific higher-layer signaling (e.g., RRC signal). The "invalid symbol" may be, for example, a symbol configured as an uplink symbol by information on the slot format or also may be a symbol in which the PUCCH repetition is not required.

Moreover, base station 100 may indicate, by an UE-specific higher-layer signaling (RRC signal), the presence or absence of bit field indicating whether to apply the information on the invalid symbol in DCI for assigning PDSCH.

For example, in a case where DCI fir assigning PDSCH has no bit field indicating whether to apply the information on the invalid symbol while a transmission duration of one PUCCH repetition includes an invalid symbol, terminal 200 may determine that a conflict with the uplink/downlink pattern has occurred in the invalid symbol, and may apply the same operation as in the above-described embodiments.

Further, in a case where DCI for assigning PDSCH has a bit field indicating whether to apply the information on the invalid symbol while "0" is indicated to the bit field of DCI and a transmission duration of one PUCCH repetition includes an invalid symbol, terminal 200 may determine that a conflict with the uplink/downlink pattern has occurred in the invalid symbol, and may apply the same operation as in the above-described embodiments. in contrast, for example, in a case where "1" is indicated to the bit field of DCI while a transmission duration of one PUCCH repetition includes an invalid symbol, terminal 200 may determine the invalid symbol as an uplink symbol, and may apply the same operation as in the above-described embodiments.

The values of the bit fields are not limited to the above-mentioned example (e.g., 0: applied, 1: not applied).

Moreover, the information on the invalid symbol in Option 3 may be indicated to the PUSCH repetition, for example. The information on the invalid symbol for the PUSCH repetition and the method regarding the invalid symbol for the PUCCH repetition may be indicated by the same higher-layer signal (e.g., RRC signal) or another higher-layer signal (e.g., RRC signal).

Furthermore, each of the above-mentioned information on the PUCCH resource for the PUCCH repetition is not limited to being indicated by the above-mentioned signals, and may be, for example, indicated or configured by any of the UE-specific higher-layer signal and DCI, or may be defined in the standard.

The methods for indicating a PUCCH resource to a PUCCH repetition have been described thus far.

In the embodiments described above, as an example, the allocation methods of the PUCCH resource to ACK/NACK (e.g., response signal to downlink data signal) have been described, but the allocation target of a PUCCH resource is not limited to ACK/NACK. For example, the target may be uplink control information (UCI), such as CSI or SR, which are different from ACK/NACK, and/or may be an uplink data signal (e.g., PUSCH).

Further, in the embodiments described above, the uplink communication in which a signal is transmitted from the terminal to the base station has been assumed. However, an exemplary embodiment of the present disclosure is not limited to this and may be applied to communication between terminals (e.g., sidelink communication).

Further, the downlink control channel, the downlink data channel, the uplink control channel, and the uplink data channel are not limited to PDCCH, PDSCH, PUCCH, and PUSCH, respectively, but may be control channels with other names.

In addition, in the embodiments described above, the higher-layer signaling has been assumed to be the RRC signaling, but the RRC signaling may be replaced with an indication by DCI that is signaling of Medium Access Control (MAC) and the signaling of the physical layer.

In addition, in the embodiments described above, the time resource unit (e.g., scheduling unit) is not limited to a slot. The time resource unit may be, for example, a time resource unit such as a frame, a subframe, a slot, a subslot, or a symbol, and may be another time resource unit. The frequency resource unit is not limited to a resource block (e.g., PRB). The frequency resource unit may be a frequency resource unit such as a bandwidth part (BWP), a resource block group (RBG), a subcarrier, or a resource element group (REG), and may be another frequency resource unit.

In addition, the parameters applied in the embodiments described above are merely examples and are not limited to these examples. For example, at least one of the parameters such as symbols number L, repetition number K, cyclic the shift sequence number, the OCC number, or the up/down link pattern indicated by SFI is not limited to a value in the embodiments described above and may be another value.

In addition, in the embodiments described above, the cases where PUCCH formats 0 to 4 are applied have been described, but PUCCH formats are not limited to these cases. For example, another PUCCH format may be applied which has a different combination of parameters such as the number of bits in UCI (i.e., use case), the symbol length (i.e., duration), the RB size, the number of multiplexable terminals, the multiplexing method (e.g., cyclic shift sequence number and OCC number), or the encoding method. Further, the parameters relating to the PUCCH formats are not limited to, for example, the values indicated in FIG. 1 and may be other values.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 16:
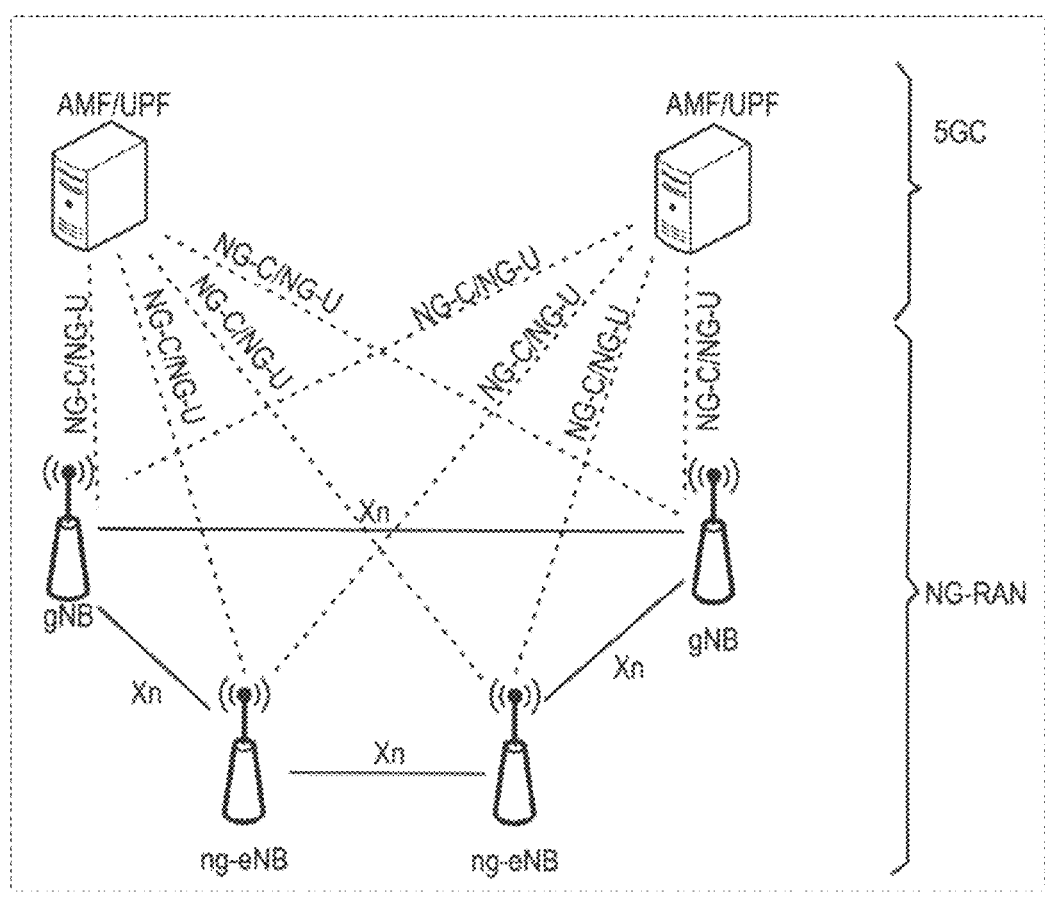
FIG. 16 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 16 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 17:
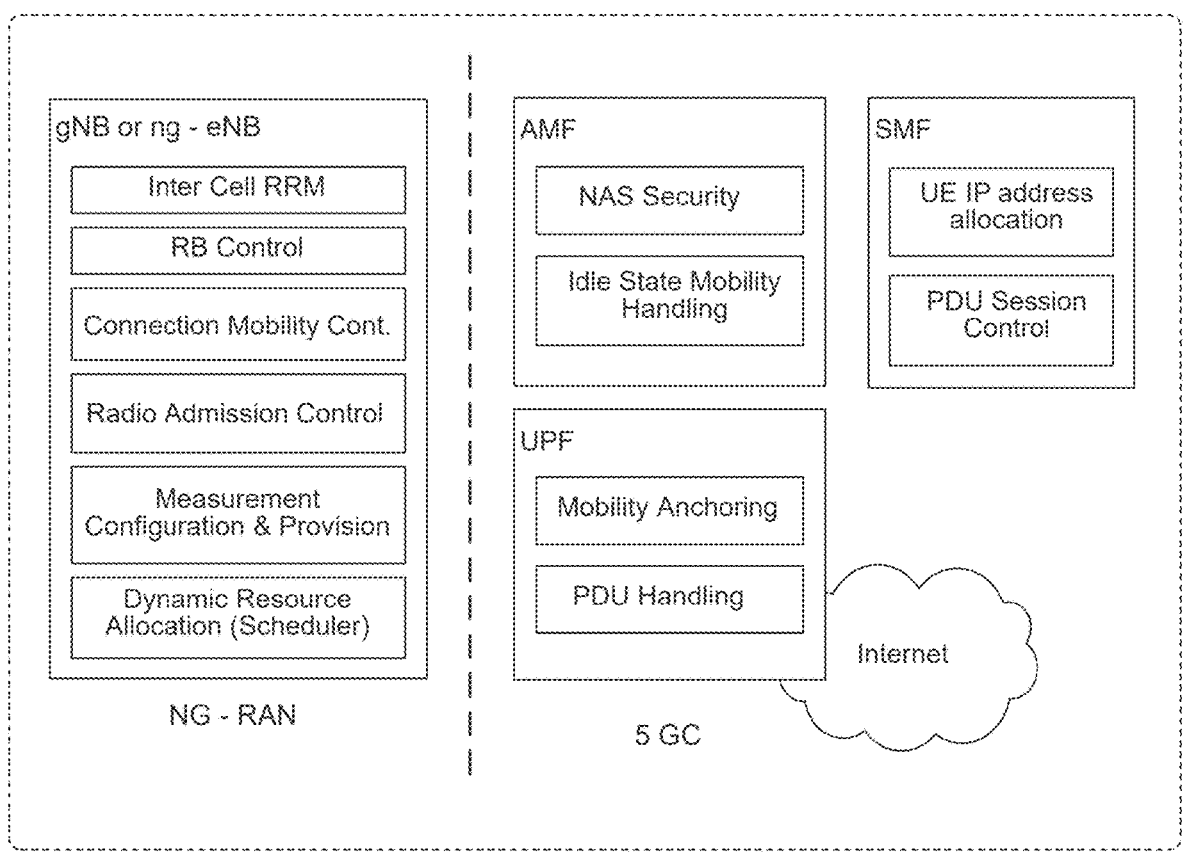
FIG. 17 schematically illustrates a functional split between Next Generation-Radio Access Network (NG-RAN) and 5th Generation Core (5GC)

FIG. 17 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data indication triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data indication.

<RRC Connection Setup and Reconfiguration Procedure>

Figure 18:
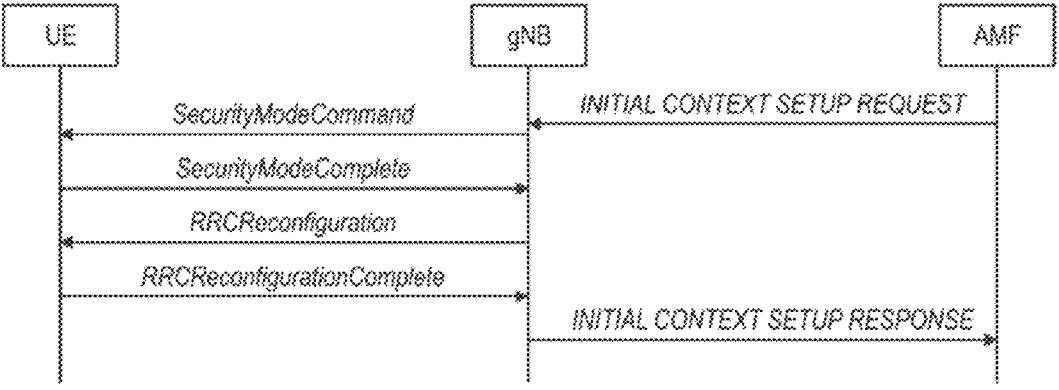
FIG. 18 is a sequence diagram of a Radio Resource Control (RRC) connection setup/reconfiguration procedure.

FIG. 18 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 19:
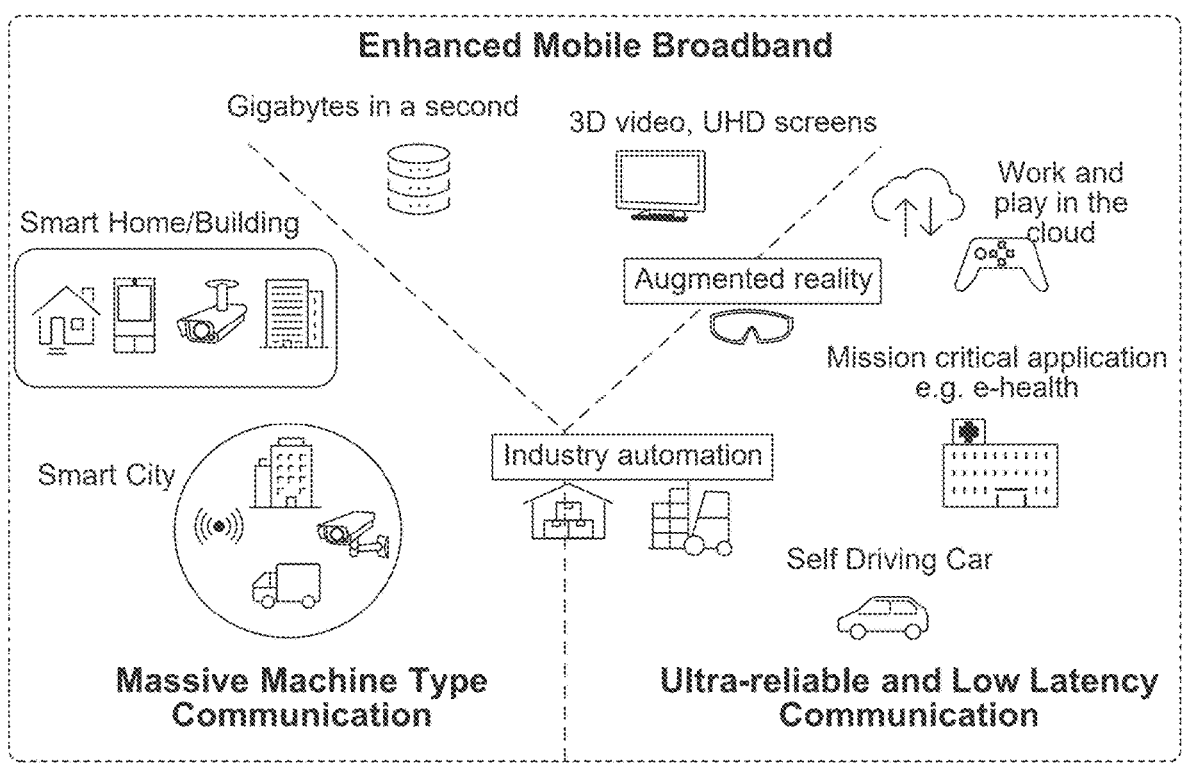
FIG. 19 schematically illustrates usage scenarios of enhanced Mobile Broadband (eMBB), massive Machine Type Communications (mMTC), and Ultra Reliable and Low Latency Communications (URLLC)

FIG. 19 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 4 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E−5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (ARNR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E−5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few µs (where the value can be one or a few µs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions, For each UE, the NG-RAN establishes at least one Data Radio Bearer (DRB) together with the PDU session, e.g., as illustrated above with reference to FIG. 18. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 20:
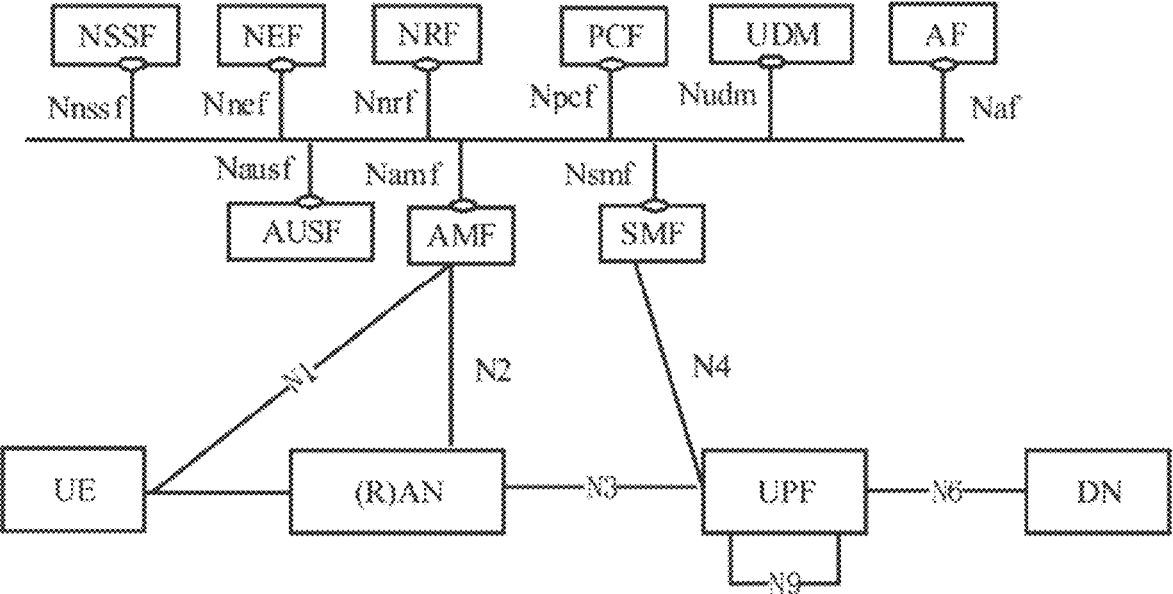
FIG. 20 is a block diagram illustrating an exemplary 5G system architecture for a non-roaming scenario.

FIG. 20 illustrates a 5G NR non-roaming reference architecture (see TS 23.501 v16.1.0, section 4.23). An Application Function (AF) (e.g., an external application server hosting 5G services, exemplarily described in FIG. 19) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 20 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and mining on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein mads be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and; or function as a receiver and a transmitter. The transceiver, as the transmitter and receiver, may include an RF (radio frequency) module and one or more antennas. The RF module may include an amplifier, RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, configures a plurality of first transmission occasions for a unit time duration corresponding to a scheduling unit; and transmission circuitry, which, in operation, performs a repeated transmission of uplink control information in the plurality of first transmission occasions.

In an exemplary embodiment of the present disclosure, the control circuitry changes, based on information on a symbol configuration in the unit time duration, a transmission occasion in which one or some symbols are configured as downlink symbol(s) among the plurality of first transmission occasions, into a second transmission occasion including a symbol different from and other than the one or some symbols.

In an exemplary embodiment of the present disclosure, the control circuitry divides, among the plurality of first transmission occasions, a transmission occasion extending over a plurality of the unit time durations into a plurality of the second transmission occasions at a boundary between the plurality of unit time durations.

In an exemplary embodiment of the present disclosure, the control circuitry punctures the uplink control information having a format corresponding to at least one of the plurality of first transmission occasions, in a case where a number of symbols of the second transmission occasion is smaller than a number of symbols of the at least one of the plurality of first transmission occasions.

In an exemplary embodiment of the present disclosure, the control circuitry determines a format of the uplink control information, based on a number of symbols of the second transmission occasion.

In an exemplary embodiment of the present disclosure, in a case where a certain condition is satisfied in the second transmission occasion, the control circuitry determines no transmission of the uplink control information in the second transmission occasion.

In an exemplary embodiment of the present disclosure, the certain condition is that a format corresponding to the second transmission occasion is different from a format corresponding to at least one of the plurality of first transmission occasions.

In an exemplary embodiment of the present disclosure, the certain condition is that a number of symbols of the second transmission occasion is smaller than a threshold value.

In an exemplary embodiment of the present disclosure, the certain condition is that a reference signal is not included in the second transmission occasion.

In an exemplary embodiment of the present disclosure, a format corresponding to the uplink control information is a format having a defined number of symbols equal to or smaller than a threshold value.

In an exemplary embodiment of the present disclosure, at least one of the plurality of first transmission occasions is configured by a combination of symbols in units of a number of symbols corresponding to the format.

In an exemplary embodiment of the present disclosure, in a case where a first parameter relating to terminal multiplexing and being configured for the terminal is included in a second parameter that is defined in the format determined for the second transmission occasion, the control circuitry determines transmission of the uplink control information in the second transmission occasion.

In an exemplary embodiment of the present disclosure, in a case where the first parameter is not included in the second parameter for the second transmission occasion, the control circuitry determines no transmission of the uplink control information in the second transmission occasion.

In an exemplary embodiment of the present disclosure, in a case where the first parameter is not included in the second parameter for the second transmission occasion, the transmission circuitry transmits, in the second transmission occasion, the uplink control information by using a frequency resource associated with the first parameter.

In an exemplary embodiment of the present disclosure, the transmission circuitry transmits, in the second transmission occasion, the uplink control information by using a plurality of frequency resources.

A communication method according to an exemplary embodiment of the present disclosure includes: configuring, by a terminal, a plurality of transmission occasions for a unit time duration corresponding to a scheduling unit; and performing, by the terminal, a repeated transmission of uplink control information in the plurality of transmission occasions.

The disclosure of Japanese Patent Application No. 2020-020721, filed on Feb. 10, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:
1. A terminal, comprising:
reception circuitry, which, in operation, receives, by using a User Equipment (UE)-specific higher-layer signaling, a semi-static Physical Uplink Control Channel (PUCCH) resource configuration including a PUCCH resource set, and receives, by using a Downlink Control Information (DCI), an identification of a PUCCH resource to be used for transmitting ACK/NACK to a Physical Downlink Shared Channel (PDSCH), among a plurality of PUCCH resources included in the PUCCH resource set, wherein the PUCCH resource is configured with one or more parameters including information on a number of PUCCH repetitions, wherein the number is 1 (absence of PUCCH repetition) or 2 or more;

control circuitry, which, in operation, configures a plurality of first transmission occasions for a unit time duration corresponding to a scheduling unit according to the semi-static PUCCH resource configuration; and transmission circuitry, which, in operation, performs a repeated transmission of uplink control information in the plurality of first transmission occasions according to the number of PUCCH repetitions indicated by the DCI, wherein a PUCCH format usable in the repeated transmission of the uplink control information has a defined symbol length equal to or smaller than a threshold value.

2. The terminal according to claim 1, wherein the control circuitry changes, based on information on a symbol configuration in the unit time duration, a transmission occasion in which one or some symbols are configured as downlink symbol(s) among the plurality of first transmission occasions, into a second transmission occasion including a symbol different from and other than the one or some symbols.

3. The terminal according to claim 2, wherein the control circuitry divides, among the plurality of first transmission occasions, a transmission occasion extending over a plurality of the unit time durations into a plurality of the second transmission occasions at a boundary between the plurality of unit time durations.

4. The terminal according to claim 2, wherein the control circuitry punctures the uplink control information having a PUCCH format corresponding to at least one of the plurality of first transmission occasions, in a case where a number of symbols of the second transmission occasion is smaller than a number of symbols of the at least one of the plurality of first transmission occasions.

5. The terminal according to claim 2, wherein the control circuitry determines a PUCCH format of the uplink control information, based on a number of symbols of the second transmission occasion.

6. The terminal according to claim 5, wherein, in a case where a first parameter relating to terminal multiplexing and being configured for the terminal is included in a second parameter that is defined in the PUCCH format determined for the second transmission occasion, the control circuitry determines transmission of the uplink control information in the second transmission occasion.

7. The terminal according to claim 6, wherein, in a case where the first parameter is not included in the second parameter for the second transmission occasion, the control circuitry determines no transmission of the uplink control information in the second transmission occasion.

8. The terminal according to claim 6, wherein, in a case where the first parameter is not included in the second parameter for the second transmission occasion, the transmission circuitry transmits, in the second transmission occasion, the uplink control information by using a frequency resource associated with the first parameter.

9. The terminal according to claim 2, wherein, in a case where a certain condition is satisfied in the second transmission occasion, the control circuitry determines no transmission of the uplink control information in the second transmission occasion.

10. The terminal according to claim 9, wherein the certain condition is that a PUCCH format corresponding to the second transmission occasion is different from a PUCCH format corresponding to at least one of the plurality of first transmission occasions.

11. The terminal according to claim 9, wherein the certain condition is that a number of symbols of the second transmission occasion is smaller than a threshold value.

12. The terminal according to claim 9, wherein the certain condition is that a reference signal is not included in the second transmission occasion.

13. The terminal according to claim 2, wherein the transmission circuitry transmits, in the second transmission occasion, the uplink control information by using a plurality of frequency resources.

14. The terminal according to claim 1, wherein at least one of the plurality of first transmission occasions is configured by a combination of symbols in units of a number of symbols corresponding to the PUCCH format.

15. The terminal according to claim 1, wherein the one or more parameters further include information on: a PUCCH format, a time resource including a symbol position or a number of symbols, a frequency resource including a Physical Resource Block (PRB) number or a number of PRBs or whether to apply frequency hopping, or a code resource including a cyclic shift sequence number or a orthogonal code number.

16. The terminal according to claim 1, wherein the DCI indicates the number of PUCCH repetitions for the PUCCH resource, whereas a number of PUCCH repetitions is separately indicated for another PUCCH resource.

17. The terminal according to claim 1, wherein the transmission circuitry does not transmit a PUCCH in the unit time duration in a transmission occasion in which one or more symbols are configured as downlink symbol(s) or a Flexible symbol(s) among the plurality of first transmission occasions.

18. A communication method, comprising:

receiving, by using a User Equipment (UE)-specific higher-layer signaling, a semi-static Physical Uplink Control Channel (PUCCH) resource configuration including a PUCCH resource set;

configuring, by a terminal, a plurality of transmission occasions for a unit time duration corresponding to a scheduling unit according to the semi-static PUCCH resource configuration;

receiving, by using a Downlink Control Information (DCI), an identification of a PUCCH resource to be used for transmitting ACK/NACK to a Physical Downlink Shared Channel (PDSCH), among a plurality of PUCCH resources included in the PUCCH resource set, wherein the PUCCH resource is configured with one or more parameters including information on a number of PUCCH repetitions, wherein the number is 1 (absence of PUCCH repetition) or 2 or more; and performing, by the terminal, a repeated transmission of uplink control information in the plurality of transmission occasions according to the number of PUCCH repetitions indicated by the DCI, wherein a PUCCH format usable in the repeated transmission of the uplink control information has a defined symbol length equal to or smaller than a threshold value.

\* \* \* \* \*